United States Patent
Stuber et al.

(10) Patent No.: US 9,037,844 B2
(45) Date of Patent: May 19, 2015

(54) SYSTEM AND METHOD FOR SECURELY COMMUNICATING WITH ELECTRONIC METERS

(75) Inventors: Michael T. Garrison Stuber, Newman Lake, WA (US); Richard Eric Robinson, Bothell, WA (US)

(73) Assignee: Itron, Inc., Liberty Lake, WA (US)

( * ) Notice: Subject to any disclaimer, the term of this patent is extended or adjusted under 35 U.S.C. 154(b) by 708 days.

(21) Appl. No.: 12/714,189

(22) Filed: Feb. 26, 2010

(65) Prior Publication Data

US 2010/0241848 A1 Sep. 23, 2010

Related U.S. Application Data

(60) Provisional application No. 61/156,023, filed on Feb. 27, 2009.

(51) Int. Cl.
*H04L 9/00* (2006.01)
*H04L 29/06* (2006.01)
(Continued)

(52) U.S. Cl.
CPC ............ *H04L 63/0442* (2013.01); *G01D 4/004* (2013.01); *Y02B 90/242* (2013.01); *Y04S 20/322* (2013.01); *H04L 67/12* (2013.01); *H04L 63/126* (2013.01); *H04B 2203/5433* (2013.01)

(58) Field of Classification Search
CPC ................ Y02B 90/242; Y04S 20/322; H04B 2203/543; H04B 2203/03; H04L 67/12; H04L 63/126; H04L 63/0442; G01D 4/004
USPC .................. 709/203; 380/255, 282, 277, 247; 713/153, 170; 726/2, 12
See application file for complete search history.

(56) References Cited

U.S. PATENT DOCUMENTS

| | | |
|---|---|---|
| 6,801,865 B2 | 10/2004 | Gilgenbach et al. |
| 7,415,368 B2 | 8/2008 | Gilbert et al. |
| 7,890,997 B2 | 2/2011 | Walker et al. |

(Continued)

FOREIGN PATENT DOCUMENTS

| | | |
|---|---|---|
| WO | WO 2006/059195 A1 | 6/2006 |
| WO | WO 2008/033287 A2 | 3/2008 |

OTHER PUBLICATIONS

Bennett, C.; Highfill, D.; Networking AMI Smart Meters; Energy 2030 Conference; Nov. 17-18, 2008; Atlanta, GA; pp. 1 to 8; IEEE.

(Continued)

*Primary Examiner* — Mohammad A Siddiqi
(74) *Attorney, Agent, or Firm* — Lee & Hayes, PLLC

(57) ABSTRACT

An infrastructure for securely communicating with electronic meters is described, which enables secure communication between a utility and a meter located at a customer, over a communication link or connection such as via a network. This enables messages to be sent from the utility to the meter and vice versa in a secure manner. The network provides a communication medium for communicating via the C12.22 protocol for secure metering. A cryptographic backend is used to cryptographically process messages to be sent to the meter and to similarly cryptographically process messages sent from the meter. By providing appropriate cryptographic measures such as key management, confidentiality and authentication, the meter can only interpret and process messages from a legitimate utility and the utility can ensure that the messages it receives are from a legitimate meter and contain legitimate information.

28 Claims, 15 Drawing Sheets

(51) Int. Cl.
*G01D 4/00* (2006.01)
*H04L 29/08* (2006.01)

(56) References Cited

U.S. PATENT DOCUMENTS

| | | | |
|---|---|---|---|
| 7,913,301 B2 | 3/2011 | Walker et al. | |
| 8,295,492 B2 | 10/2012 | Suarez et al. | |
| 2003/0037237 A1 | 2/2003 | Abgrall et al. | |
| 2004/0068650 A1 | 4/2004 | Resnitzky et al. | |
| 2006/0206433 A1 | 9/2006 | Scoggins | |
| 2008/0229107 A1* | 9/2008 | Nakhjiri et al. | 713/172 |
| 2008/0301776 A1* | 12/2008 | Weatherford | 726/3 |
| 2009/0034419 A1 | 2/2009 | Flammer, III et al. | |
| 2009/0125351 A1* | 5/2009 | Davis et al. | 705/7 |
| 2009/0193253 A1* | 7/2009 | Falk et al. | 713/171 |
| 2010/0017601 A1* | 1/2010 | Falk et al. | 713/168 |

OTHER PUBLICATIONS

Mander T. et al.; "Network Cyber-Security Architecture for Smart Distribution System Operations"; Power and Energy Society General Meeting—Conversion and Delivery of Electrical Energy in the 21$^{st}$ Century; Jul. 20-24, 2008; Pittsburgh, U.S.A.; pp. 1 to 8; 2008; IEEE.

Das V.V.; "Wireless Communication System for Energy Meter Reading"; ARTCom '099—International Conference on Advances in Recent Technologies in Communication and Computing; Oct. 27-28, 2009; Kottayam, India; pp. 296 to 898.

"Critical Infrastructure Protection for AMI Using a Comprehensive Security Platform"; Certicom White Paper; Feb. 2009; pp. 1 to 13; retrieved from the internet Jun. 6, 2006 at http://www.certicom.com/images/pdfs/wp-ami-infrastructure.pdf.

Hayami, Jamie; International Search Report from corresponding PCT Application No. PCT/CA2010/000267; search completed Jun. 6, 2010.

"Advanced Metering Infrastructure (AMI)"; http://www.itron.com/pages/solutions_printable.asp?id+itr_016422.xml; Retrieved from the internet Jan. 14, 2009; Itron Inc.

Beroset, Edward; "An Overview of ANSI C12.22"; http://www.electricenergyonline.com/?page=show_article&mag=18&article=138; Retrieved from the internet Jan. 14, 2009; Electric Energy Online.com; Electric Energy Publications Inc.

Gering, K. et al.; "Openway by Itron Security Overview"; White Paper; Dec. 29, 2008; Itron; Retrieved from internet Mar. 12, 2014; http://www.m2premier.com/uploadFiles/Itron_OpenWay_Security_Overview[1].pdf.

Kufer, L; Supplementary Search Report from corresponding European Application No. 10745774.9; search completed Mar. 12, 2014.

* cited by examiner

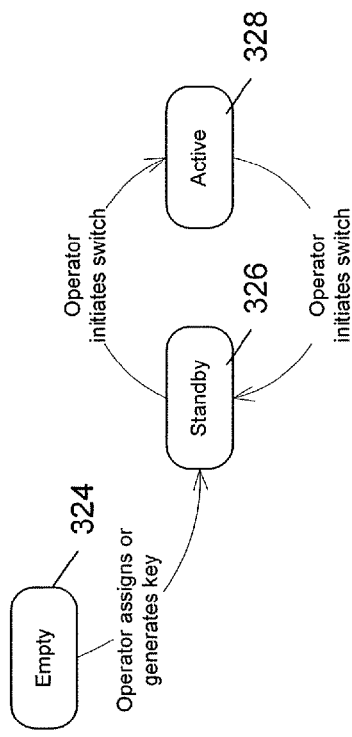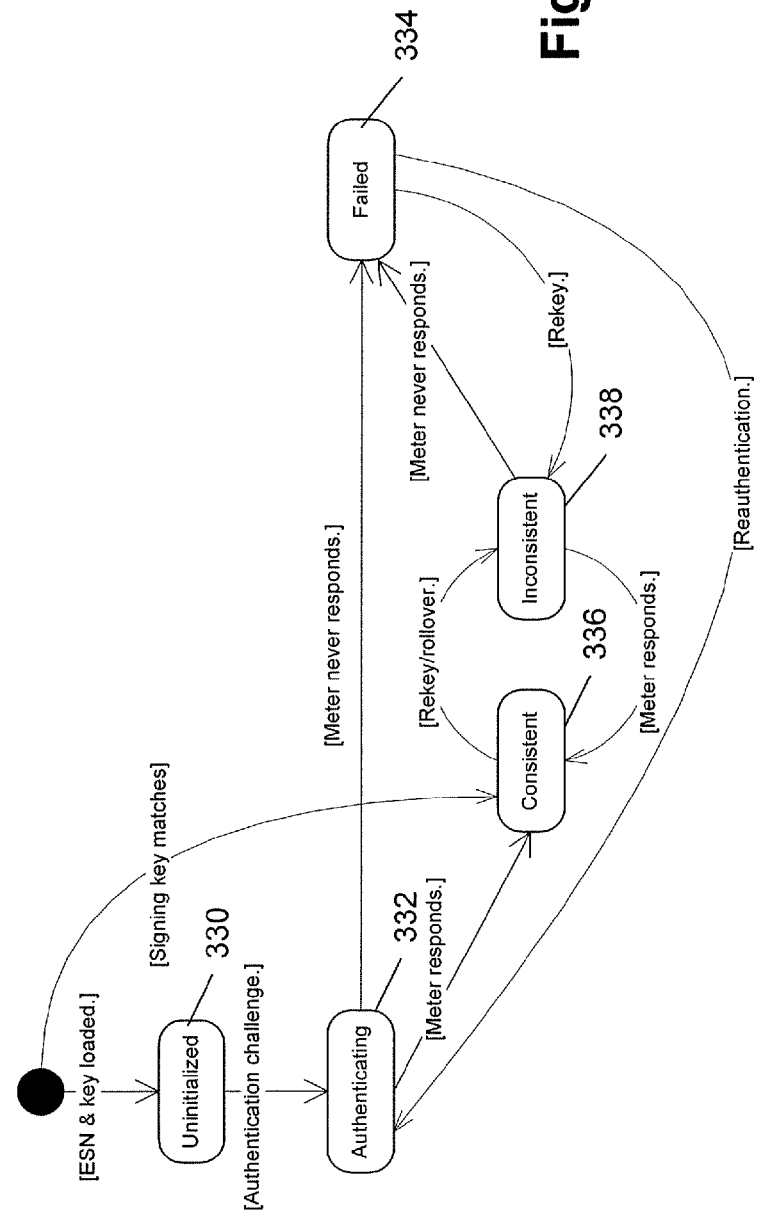

US 9,037,844 B2

SYSTEM AND METHOD FOR SECURELY COMMUNICATING WITH ELECTRONIC METERS

This application claims priority from U.S. Provisional Patent Application No. 61/156,023 filed Feb. 27, 2009, the contents of which are incorporated herein by reference.

TECHNICAL FIELD

The following relates to systems and methods for securely communicating with electronic meters.

BACKGROUND

Ever increasing energy demand and corresponding consumption has made energy management and conservation an important issue, in particular for electric and gas utilities and electricity and gas distribution networks. An important aspect of energy management involves measurement of usage by the consumers of the energy resource. In the electric and gas utility sector, there is therefore an emerging need to have an infrastructure that supports measuring and managing energy usage.

Electricity meters have long been used in the electric utility sector for measuring electricity consumption. The data formats, data structures and communications protocols for electricity meters have evolved from being proprietary to incorporating an ANSI standard, e.g. the C12.18 and C12.19 standards. This enabled utility companies to have a compatible communication protocol between ANSI meters so that they were not restricted to a single vendor. With a standard communication protocol, sending and receiving data from an electricity meter became easier. The ability to send and receive data remotely, e.g. via telephone modems was soon expected.

To address the need to communicate remotely, the C12.18 standard was adapted to create C12.21, which specified a new version of C12.18 that was modified for telephone modems. The protocol defined by C12.21 was strictly a point-to-point communication and session oriented. The intent of C12.21 was to use it with existing modems while relying on the physical attributes defined in C12.18 for implementing a compatible communication interface. With the advent of the Internet, C12.22 was then developed to be used over already existing communication networks such as TCP/IP over Ethernet, SMS over GSM, or UDP/IP over PPP over serial port. C12.22 therefore provides a common application layer that all meters can use in a manner similar to the way in which HTTP provides a common application layer for web browsers.

C12.22 provides for both session and sessionless communications. Sessionless communications have the advantage of requiring less complex handling on both sides of the communication link and fewer packets exchanged if communication sessions tend to be short. C12.22 also describes a number of application layer services that are used to handle functions of the protocol, such as identification request, read request, write request, logon request, security request, logoff request, wait request, registration request, de-registration request, resolve request, and trace request. C12.22 was used instead of other methods, e.g. wrapping C12.18 or C12.21 protocol transactions in an existing network transport protocol, to improve security, reliability, and speed.

BRIEF DESCRIPTION OF THE DRAWINGS

Embodiments will now be described by way of example only with reference to the appended drawings wherein:

FIG. 15 is a key state transition diagram.

FIG. 16 is a key update process flow.

DETAILED DESCRIPTION OF THE DRAWINGS

Although C12.22 provides a standard that enables improved security with respect to previous standards, there is a need to ensure that control of any solution for remote metering over a network such as the Internet is resistant to being compromised.

Secure Metering System Overview

Figure 1:
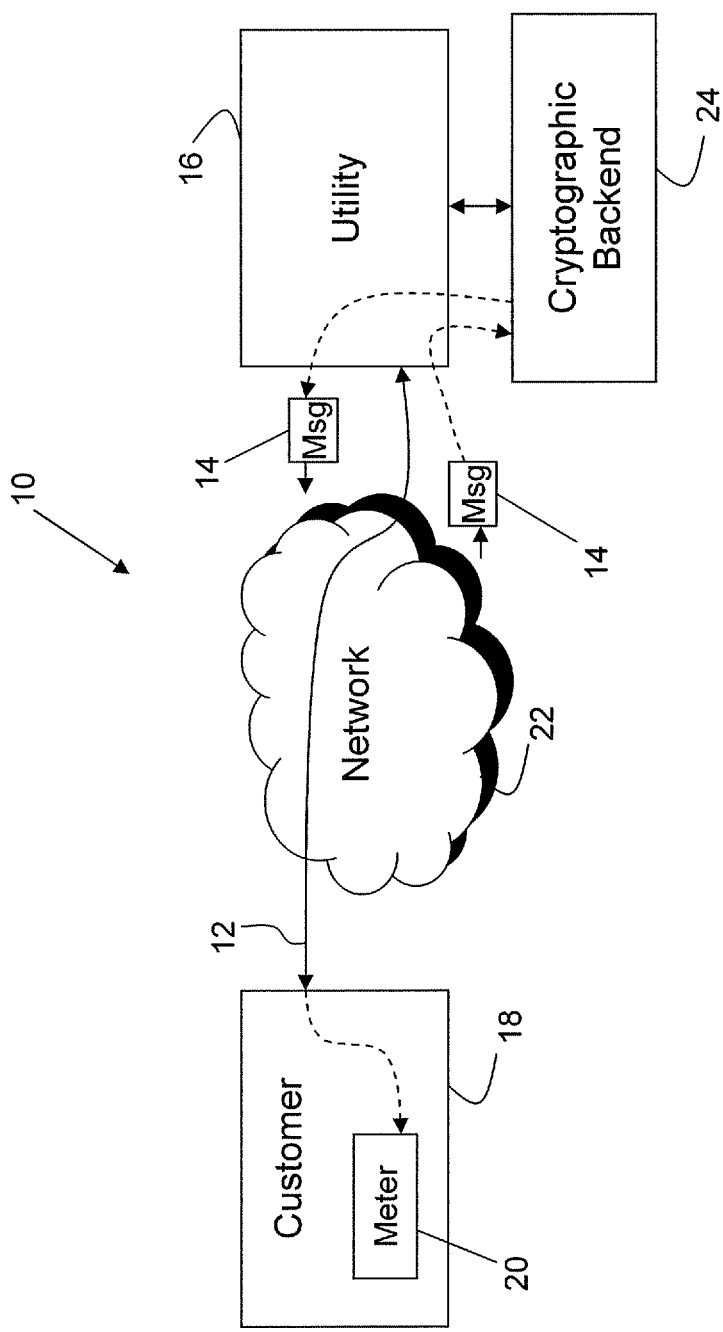
FIG. 1 is block diagram of a remote metering infrastructure comprising a cryptographic backend for securing the transmission of messages.

Turning now to FIG. 1 an infrastructure for securely communicating with electronic meters is denoted generally by numeral 10 and will hereinafter be referred to as "the infrastructure 10" and "the system 10" interchangeably. The system 10 enables secure communication between a utility 16 and a meter 20 located at a customer 18, over a communication link or connection 12. This enables messages 14 to be sent from the utility 16 to the meter 20 and vice versa. The communication link 12 can be any suitable connection utilizing any appropriate protocol and in the examples described herein is provided over a network 22, e.g. the Internet. It will be appreciated that the network 22 may represent any interconnection without limitation, including wired and wireless communication infrastructures. In the following examples, the network 22 provides a communication medium for communicating via the C12.22 protocol for secure metering.

In order for the utility 16 to securely communicate with the meter 20, a cryptographic backend 24 comprising one or more cryptographic servers is used to cryptographically process messages 14 to be sent to the meter 20 and to similarly cryptographically process messages 14 sent from the meter 20. By providing appropriate cryptographic measures such as key management, confidentiality and authentication, the meter 20 can only interpret and process messages 14 from a legitimate utility 16 and the utility 16 can ensure that the messages 14 it receives are from a legitimate meter 20 and contain legitimate information.

Figure 2:
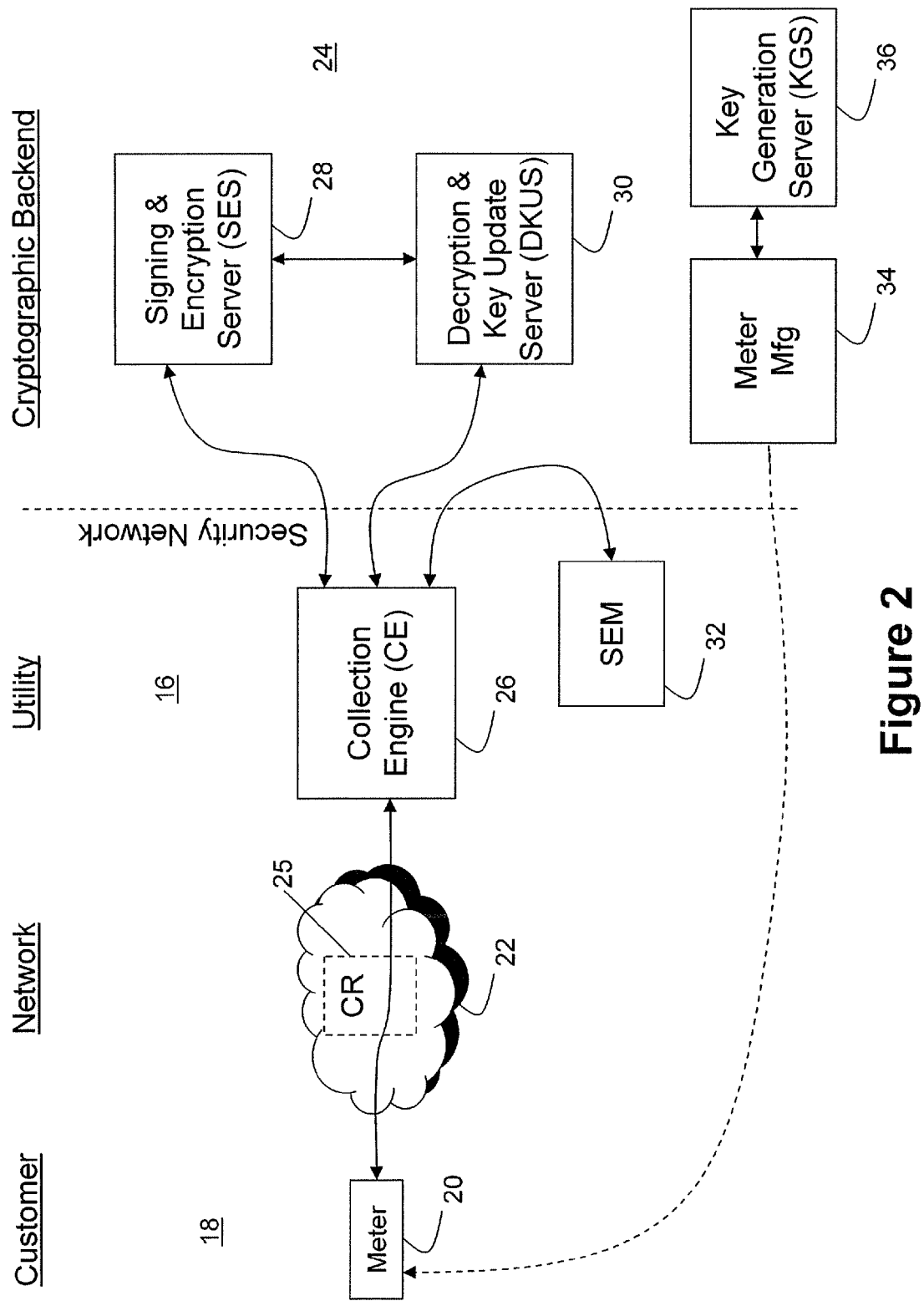
FIG. 2 is block diagram of the infrastructure of FIG. 1 showing example components for the cryptographic backend.

As shown in FIG. 2, various components at the utility 16 and within the cryptographic backend 24 in particular, are configured to provide a secure mechanism for authenticating and encrypting messages 14 distributed through the system 10, described in general above. FIG. 2 also shows a Key Generator Server (KGS) 36 for generating asymmetric keys and injecting such keys into meters 20, e.g. during the manufacturing stage 34 as exemplified. The secure metering system 10 is used to increase security on all aspects of communications between the meter 20 and head-end systems such as the utility, with a focus on privacy and authenticity.

For ease of reference, the following Table 1 provides an overview of various acronyms used in referring to the various components shown in the figures and otherwise described below.

TABLE 1

Acronyms

| | |
|---|---|
| AMCL | Appliance Message Client Library |
| APM | Application Protocol Module |
| SESAA | SES Authorization Agent |
| APMD | APM Daemon |
| CE | Collection Engine |
| CR | Cell Relay |
| SA | Security Architecture |
| SCSF | Secure Client Server Framework |
| DKUS | Decryption and Key Update Server |
| ECC | Elliptic Curve Cryptography |
| EPSEM | Extended Protocol Specification for Electric Metering |
| ESN | Electronic Serial Number |
| HSM | Hardware Security Module |
| KGCL | Key Generator Client Library |
| KGD | Key Generator Daemon |
| KGS | Key Generator Server |
| MMK | Manage Meter Keys |
| MSK | Manage Solution Keys |
| SAC | Signing Appliance Core |
| SACU | Signing Appliance Core Utility |
| SES | Signing and Encryption Server |
| SEM | Security Event Manager |

The infrastructure 10 is designed to allow control of remote metering devices (meters) 20 from a centralized location, an intermediary server referred to herein as a Collection Engine (CE) 26. The CE 26 uses ANSI C12.22 Extended Protocol Specification for Electric Metering (EPSEM) messages 14 to communicate with meters 20. The CE 26 utilizes the cryptographic backend 24 in order to prove to the meters 20 that its EPSEMs 14 are authentic. To meet this need, the cryptographic backend 24 provides a solution which allows the CE 26 to create digital signatures on EPSEMs 14, optionally encrypting the resulting payload. The cryptographic backend 24 also provides an asymmetric key generation appliance that provides private and public ECC key pairs to meters 20 during manufacturing 34.

As can be seen in FIG. 2, the cryptographic backend 24 comprises a signing and encryption server (SES) 28, a decryption and key update server (DKUS) 30, and the KGS 36 associated with the meter manufacturing stage 34. The CE 32 may also monitor or otherwise log events over the established security network using a security event monitor (SEM) 32. Also shown in FIG. 2 is a cell relay (CR) 25 which is a component that relays messages 14 from meters 20 to the appropriate CE 26, e.g. where multiple CEs 26 exist along with many meters 20 (e.g. thousands or even millions).

The components of the cryptographic backend 24 may be built upon commercially available cryptographic software development tools such as the Certicom™ Security Architecture (CSA) and the Certicom™ Secure Client Server Framework (CSCSF), wherein the CSA provides fundamental security algorithms and protocols, and the CSCSF provides a secure communication framework for client-server interactions.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of components of the cryptographic backend 24 or utility 16, or accessible or connectable thereto. Any application or module herein described may be implemented using computer readable/executable instructions that may be stored or otherwise held by such computer readable media.

Cryptographic Backend

Figure 4:
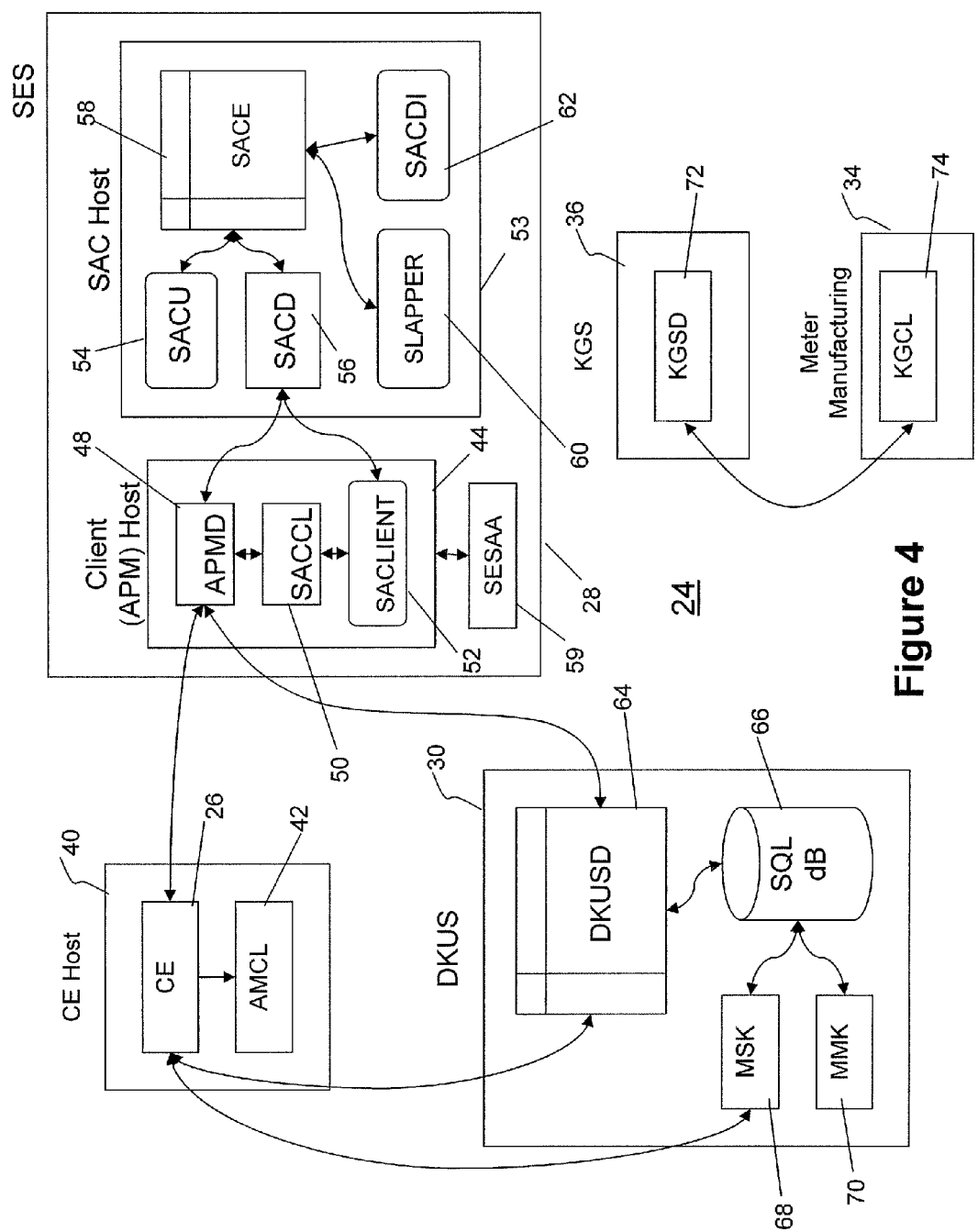
FIG. 4 is a block diagram illustrating an embodiment for the cryptographic backend shown in FIGS. 1 to 3.

As discussed above, the cryptographic backend 24 comprises a SES 28 which itself comprises two components which form an Application Protocol Module (APM) 44, a construct designed to interface with a Signing Appliance Core (SAC) 53 that provides operator authentication, secure storage, a secure signing environment and hardware random number generation through the use of a Hardware Security Module (HSM)—see also FIG. 4. The two components both utilize a common application protocol. The main component is the APM Daemon (APMD) 48, which interacts with the SAC Daemon (SACD) 56 to service signature requests (e.g. using ECDSA) and optionally encrypt responses (e.g. using AES). The secondary component is the Appliance Message Client Library (AMCL) 42 which encodes requests and decodes responses for the CE 26. In addition, there is a command line configuration utility—the Signing Appliance Core Utility (SACU) 54—which provides an administrative interface for configuring the SAC 53.

Figure 3:
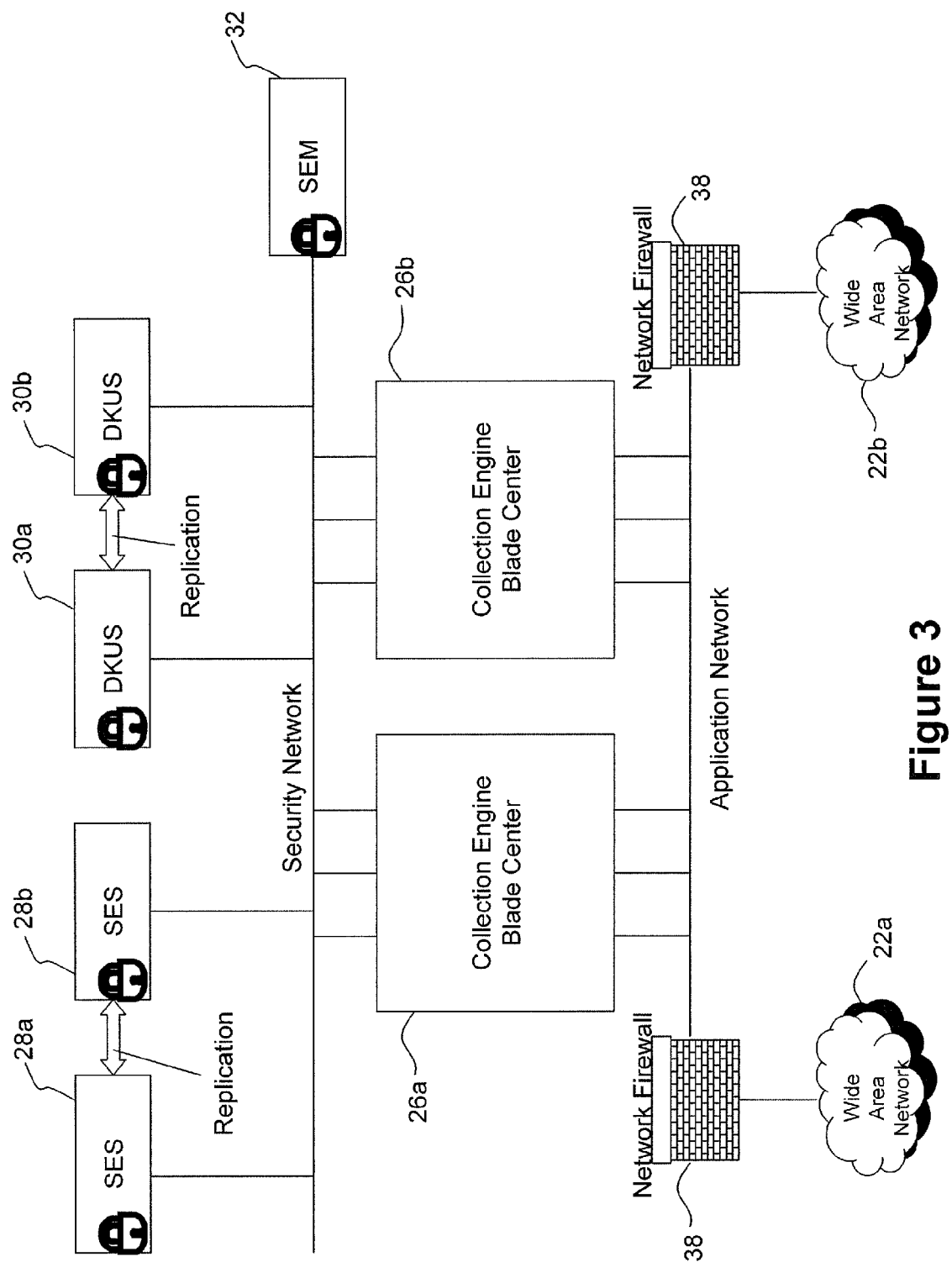
FIG. 3 is a block diagram illustrating a redundant configuration for the cryptographic backend shown in FIGS. 1 and 2.

The security appliances should be deployable in a redundant configuration. Meter reading is an important business activity for utilities and estimating bills as a result of equipment failure can lead to performance penalties from regulators and dissatisfaction from consumers. Given these concerns, utilities will typically deploy enterprise systems with a high level of redundancy. A standard production deployment will include two sites each with redundant appliances. A sample deployment for a single site is shown in FIG. 3.

The following describes the various components in the cryptographic backend 24, making reference to FIG. 4.

Signing and Encryption Server (SES)

SES Overview

The SES 28 provides both confidentiality and integrity for communications between the CE 26 and the meters 20. Commands sent to the meters 20 can create safety and reliability issues—therefore commands are typically more important to control than data returned to the CE 26 from the meters 20. Messages 14 are encrypted, in the present example, using 128-bit Advanced Encryption Standard (AES), thereby ensuring confidentiality. The integrity of commands sent by the CE 26 can be ensured by using ECC encryption.

The SES 28 is designed to enable high speed signing of data while maintaining a high security posture. The SES 28 comprises the SAC 53 and the APM 44, each being described in greater detail below. Each of these components has a corresponding daemon process, which performs the actual operations of the SES 28. The SES 28 typically has two types of users: operators and administrators, each having different access rights and corresponding accounts therefore.

The SES 28 in this example is configured such that the administrator accounts have the highest level of program permissions on the SES 28, and administrators are thus able to perform the most sensitive operations on the SES 28, including creating and restoring HSM images, user administration and key administration, while the operators are able to perform the day-to-day operations of the SES 28.

Control of the main SES 28 processes is handled through the SES 28 control script, which is a simplified command script that allows a user to start and stop the SES 28, e.g. by executing respective commands in a terminal window (not shown). The SES 28 may also comprise specific start-up and configuration routines. For example, the first time the SES 28 is used, it may require that the system be unlocked and provide the user with a choice between setting up the system from scratch or copying a configuration from a backup file.

The SES 28 acts as the APMD's host, and also comprises an SES Authorization Agent (SESAA) 59 which is a client-specific application for governing the signing operation, e.g. accepting/denying signing requests. The SESAA 59 has the ability to deny any signing operation, based on certain input. Another component of the cryptographic backend 24, the DKUS 30, is responsible for managing signing and encryption keys as well as determining whether the APMD 48 should encrypt responses. There is coordination between the DKUS 30 and APMD 48 to facilitate such functionality.

Figure 5:
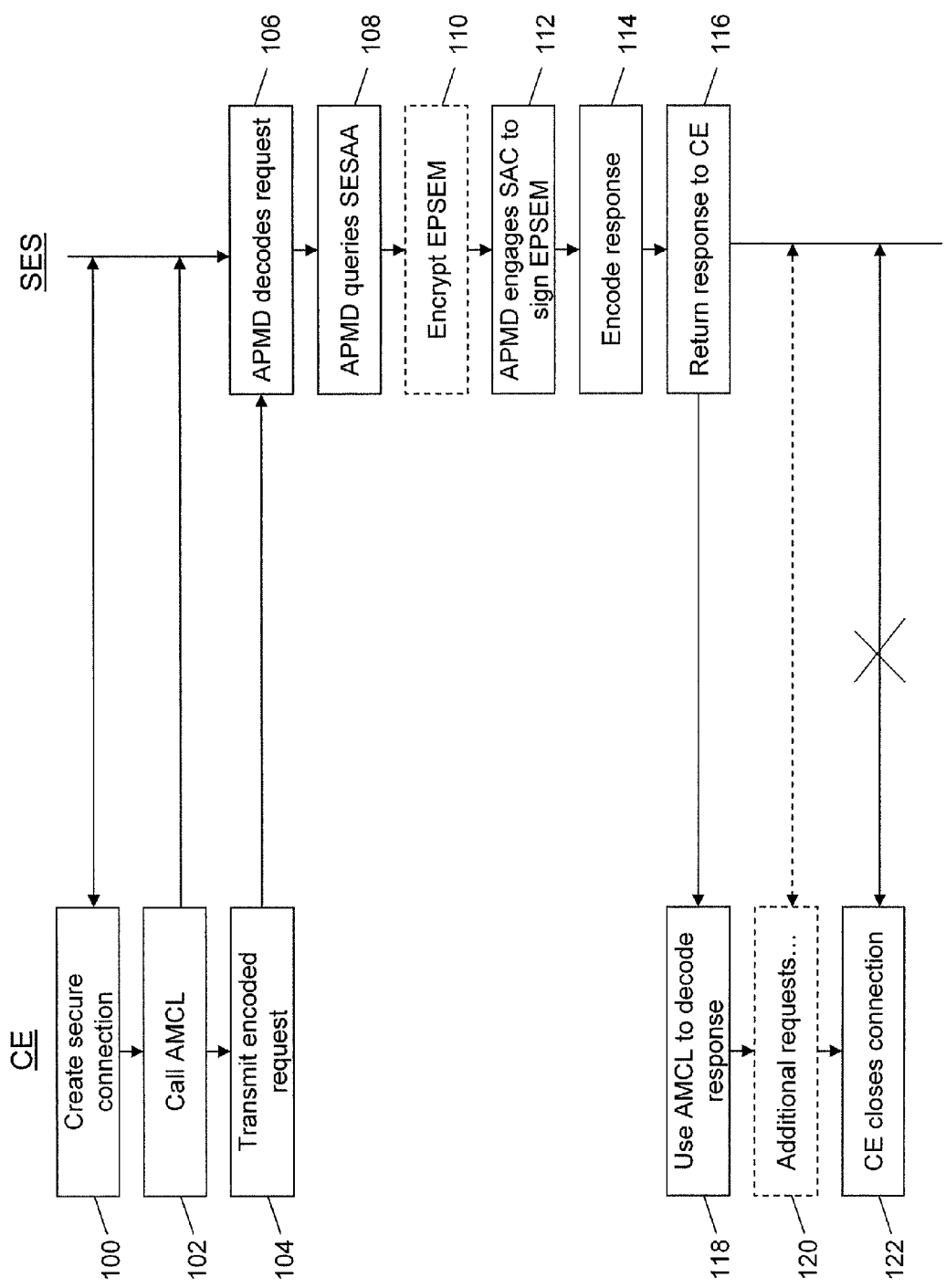
FIG. 5 is a flow diagram illustrating a communication process between the collection engine (CE) and signing and encryption server (SES).

Referring to FIG. 5, For communications between the CE 26 and the SES 28, the general data flow is as follows (note that simultaneous connections are allowed):

1. CE 26 creates a secure connection with the APMD 48 (e.g. SSL socket connection) at 100.
2. The AMCL 42 is called by the CE 26 to encode a request at 102. For example, the CE 26 calls the client API's Sign-And-Encrypt function, passing it the command message, Revocation Key usage flag, the ESN of the meter 20 and the encryption override parameter. The API then returns the encoded request for delivery to the APMD 48.
3. The CE 26 transmits the encoded request to the APMD 48 at 104.
4. The APMD 48 receives the command message and decodes the request at 106.
5. The APMD 48 queries SESAA 59 to grant authorization for this request at 108.
6. The APMD 48 encrypts the EPSEM at 110, if configured to do so. For example, if the command message 14 specifies the ESN of the meter 20, and the encryption override parameter allows for encryption (either by forcing encryption or by using the default encryption setting), then the APMD 48 forwards the command message 14 to the DKUS 30 to be encrypted using the meter key—if the encryption override parameter allows for encryption, but the ESN of the meter 20 is not specified, then the APMD 48 encrypts the message 14 using the system key—if encryption is not allowed, then the APMD 48 skips this step.
7. The APMD 48 engages the SAC 53 to sign the EPSEM in the request at 112. For example, the APMD 48 forwards the resulting command message from the previous step to the SACD 56 to be signed. If the Revocation Key is set to true, then the APMD 48 also indicates to the SACD 56 that the message needs to be signed by the active revocation key. If the Revocation Key is not set to true, then the SACD 56 will sign the message using the active command key.
8. The APMD 48 encodes the response at 114, containing the signed (and perhaps encrypted) EPSEM.
9. The APMD 48 returns the response to the CE 26 at 116.
10. The CE 26 uses the AMCL 42 to decode the response at 118. For example, the CE 26 receives the response and decodes it by calling the client API's Sign-And-Encrypt-Decode function.
11. All steps following establishment of the secure connection may be repeated for additional requests at 120.
12. When all requests have been processes, the CE 26 closes connection to APMD 48 at 122.

Communications between the DKUS 30 and the SES 28 are also permitted, in order to: determine whether the SES 28 needs to encrypt EPSEM messages before signing them; perform the encryption of data for a specific meter 20 before signing it; update the SES 28 on information that dictates which key slots map to which key labels; and update the SES 28 on which keys are currently active in the system. It may be noted that when the SES 28 system starts up, it contacts the DKUS 30 to ensure that all status information required is current. After this initial communication, however, during operation, it should be the DKUS 30 that contacts the SES 28 to inform it of DKUS 30 status changes.

Communication with the SES 28 may also be established over SSL and is initiated by the DKUS 30 to the SES 28 when the state of this information changes. The SES 28 then sends a message back to the DKUS 30 asking for updated information. In addition to the SSL mutual authentication, the SES 28 sends a password to the DKUS 30 to authenticate it as a valid SES 28 before data will be returned to the SES 28. In other embodiments, when state changes occur, each SES 28 may need to be manually restarted to obtain the most up to date copy of information available at the DKUS 30.

The AMCL 42 is, in this example, a Windows DLL which provides a simple API to encode and decode messages for the SES 28. As only one type of request/response pair exists in the present example, a sign-encrypt request, the API for the SES 28 requires only two function calls, one for encoding the request, and one for decoding the response. It may be noted that the AMCL 42 may be configured to only provide message data encodes and decodes and may not be required to provide a communication session for delivery of these messages. Communication channels for these purposes are handled by the CE 26 directly. The AMCL 42 also contains an API for the DKUS 30. In this example, there are 5 messages that the DKUS 30 receives from the CE 26, those being: decrypt and validate, generate authentication challenge, validate authentication challenge, key update notice, and update meter key. Each of these message types has an encode function and a corresponding decode function. It may be noted that the AMCL 42 only provides message data encode and decode; it does not provide a communication session for delivery of these messages. Communication channels as described herein are handled by the CE 26 directly.

The APMD 48 in this example is a Linux daemon which handles service requests. The APMD 48 depends on another listening daemon called the SACD 56, which allows access to the SAC 53 itself. The APMD 48 is not responsible for servicing signing requests until the SACD 56 has successfully started. The SACD 56 can be configured to require operator authentication. When configured this way, a selectable number of system operators would need to be present to authenticate and start the SACD 56. Before listening for requests, the APMD 48 reads a configuration file which contains information required to operate.

Figure 6:
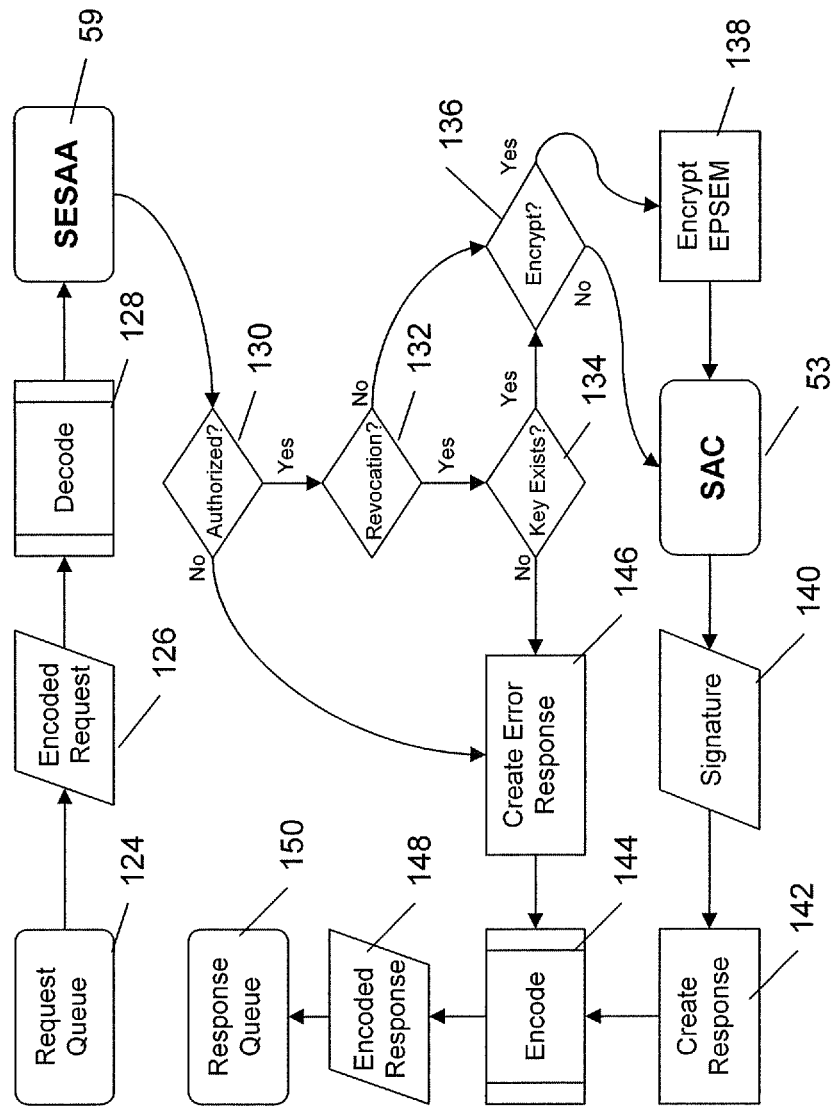
FIG. 6 is a flow diagram illustrating a data flow for authorizing and decoding a request sent to the SES.

Turning now to FIG. 6, after accepting an SSL connection with the CE 26, the APMD 48 listens to a request queue 124 for encoded requests 126 on that socket (and any other connected sockets). The requests will be decoded at 128 and queued. The APMD 48 will interface with the SESAA 59 to establish whether or not each request should be granted at 130. The SESAA 59 in this example is a Linux shared object which provides a simple interface to grant or deny a request. If the request is denied, an error message is generated at 146, encoded at 144, and returned to the CE 26 which can be decoded and interpreted for debugging. If granted, the APMD 48 determines whether this is a standard request or a revocation request by examination at 132. If it is a revocation request, the revocation key needs to be present in the SAC 53 at 134, or an error response 146 will be returned to the CE 26. If the revocation key is present or the signature request is standard, the SAC 53 is utilized to generate a signature 140 for the EPSEM embedded in the request. If encryption is enabled at 136, the EPSEM is padded if necessary, and then encrypted at 138 before signing occurs. A response is then encoded 148 and queued at 150 for return to the CE 26 on the appropriate socket connection.

The SACU 54 interfaces directly with the SAC 53 to provide the following administrative operations: initialization, key generation, key import, key export, administration key card set generation, operator passphrase set/change, SAC backup/restore, and HSM RTC synchronization. The SACU 54 can be a session-based command-line application, compiled for the target platform (i.e., Linux in this example).

Backup and Disaster Recovery

The cryptographic backend 24 should be capable of backup and disaster recovery for the SES 28. There are two types of data to back up on the SES 28, namely the system configuration data, and the HSM data. Configuration data may be stored (in plaintext) on the host file system, and can be backed up manually by copying to a designated secure location. The HSM data is backed up by first generating a backup encryption key within the HSM (using the SACU 54), then exporting this key using an N-of-M key splitting scheme (whereby the backup key is split into M pieces, requiring only N (<=M) splits to recover the key) onto individual password protected Security Officer smartcards. This occurs when the device is first initialized. The SACU 54 is then utilized (whenever the HSM data is changed) to export the HSM data to the host file system, encrypting the data with this backup key. This encrypted HSM backup data should be stored in a secure location (along with the configuration data).

Recovery of the SES 28 involves copying of configuration and encrypted HSM backup data to the new SES 28, then using the SACU 54 to recover the HSM data into the new HSM. It may be noted that the HSM recovery operation in this example would require N Security Officers utilizing their corresponding password protected smartcards.

For disaster recovery purposes, as shown in FIG. 3, two systems are shipped, with two primary (active) systems. Both SESs 28 are expected to be on-line at all times, each configured to support communication from a CE 26 and to a specific DKUS 30. If one of the SESs 28 should go down, the other SES 28 can be contacted and be expected to perform the correct operation. To ensure that both SESs 28 are synchronized, an operator should manually propagate any changes (whether within the HSM or the configuration data) to the other SES 28—in general, changes to an SES 28 are considered infrequent. It may be noted that should the primary DKUS 30 go down, both SESs 28 will need to be stopped, reconfigured (to communicate with the backup DKUS 30), then restarted.

SES Initialization and Administrative Protection

In one example, when the SES 28 is shipped, it is locked with a password to prevent tampering. To unlock the SES 28, an executable file can be run, which present you with an option to unlock the system. Upon selecting such an option, the SES 28 prompts the user to enter the system's initialization passphrase. The initialization passphrase may be provided in any suitable manner. For example, a call may be made to a trusted entity to verify the identity of the user performing the initialization. If verified, the trusted entity may then provide the initialization passphrase.

Once the SES 28 has been unlocked, the SES 28 may then enable the user to choose to import an existing SAC 53 backup (further detail of the SAC 53 is provided in the next section). This option would allow the user to overwrite the current system configuration and replace it with a stored image.

In some embodiments, to increase security, the SES 28 may require that a certain number of administrators authenticate themselves with the system before administrative privileges are given, e.g. up to seven administrators required but no less than one. For example, if ten administrator accounts are created, and the SES 28 is programmed/configured such that four administrators must be authenticated with the SES 28 before administrative privilege is granted, then any four of the ten administrators must login to the system (e.g. be authenticated) before administrative tasks may be performed.

After specifying the number of administrators that must authenticate with the system to gain administrative privileges, such administrator accounts may need to be configured. For each account, a user ID and a password may be entered/assigned and the user then prompted to insert a keycard, which stores the account details. Once the accounts have been configured, the initialization program exits and the SES 28 is available for use. At this point, operators can be added and key operations and other SES 28 tasks can be performed.

It may be noted that while only a set number of accounts are created during the initialization process (i.e. the number of administrator accounts being specified), once the SES 28 is operational, additional accounts of either type (administrator or operator) can be added. Also, while the number of required operators may be changed after the initial configuration, the number of administrators required to perform administrator-level functions should be fixed.

In the present example, the SES 28 comprises two configuration files that are to be completed before the system is usable: a SACD 56 configuration file and an APMD 48 configuration file. These configuration files control the settings of the daemon processes that make up the SES 28. Further details of each configuration file are provided below.

The card reader should be successfully attached to the system before administrative operations can be performed. This requires that the card reader's physical connection to the system be correct, and that the system recognizes the card reader. Attachment of the card reader to the system can be performed by: 1. Attaching the card reader to a serial port on the back of an HSM card; 2. Providing power to the card reader; 3. Ensuring that the SES 28 has been stopped and that SACU 54 is not running; and 4. Running a reset command from the command line to reboot the HSM card. After attaching the card reader, the user can verify that the system has recognized the reader. If the card reader has been properly attached to the system, then the output of the command may list two slots: slot 0 and slot 1. If the card reader is not recognized by the system, then only one slot will be listed: slot 0. The command then outputs a message when the card reader has been successfully connected to the system:

The SACU 54 program provides the option to create a backup image of the SAC's current configuration. The option to create a backup image may be made available once number of administrators have been authenticated (i.e. the number of administrators required to perform sensitive operations, specified during the initialization of the SES 28). Once the authentication process is complete, the user then creates a backup by selecting a suitable backup command. The backup command then packages the HSM file system, encrypts it using the backup key and exports the encrypted file system as an image file that may be stored anywhere for backup purposes. The backup images may be used to configure a SES 28. This configuration may either be done during the initialization of a new SES 28 or by choosing the system restore option from SACU 54 on a configured SES 28. Using an existing SAC image is particularly useful when one SES 28 has been configured to be the primary SES 28, and the user wishes to copy its configuration to other SES 28 systems (e.g. backup systems). It may be noted that configuring a SES 28 from an image may be considered similar to restoring a SES 28 from an image.

When using an existing image, the following may be done: 1. Authenticate the appropriate number of administrators; 2. Provide the image file to the SES 28 (such that the SES 28 reads and decrypts the image); and 3. Load the backup image onto the HSM, overwriting any existing information.

Many SAC functions can be configured to require administrative privileges. In one example, a process such as the administrator authentication process, which when completed successfully, results in administrative privileges being granted, is as follows: 1. Launch SACU 54 to perform an administrative operation (e.g. add an operator); 2. SACU 54 presents the authentication options for administrators and operators; 3. The user, Administrator X, chooses to login as an administrator; 4. SACU 54 requests a user ID and password for Administrator X; 5. Administrator X enters their user ID and password; 6. SACU 54 prompts Administrator X to insert their smart card into the card reader; 7. Administrator X inserts their smart card and presses the "Enter" key to continue; 8. SACU 54 authenticates Administrator X; 9. Steps 4 through 8 are completed for the remaining number of administrators that are required to be authenticated (as determined by the configuration of the SES 28); and 10. The authentication process is completed and the administrator menu is presented to the user.

For example, if the number of administrators required to be authenticated is two (2), then the administrator menu is not be presented unless any 2 administrators have been successfully authenticated. It may be noted that it is beneficial to have a greater number of administrators on the SES 28 than required, so that if one administrator is unable to login to the system (e.g. due to a forgotten ID or password), then there are enough remaining administrators to still be able to gain administrator privileges.

Non-administrative functions on the SAC 53 may be performed by operators. The following is one example of a process for authenticating an operator: 1. Launch SACU 54 to perform an operator operation (e.g. change the operator's password); 2. SACU 54 presents the authentication options for administrators and operators; 3. The user, Operator X, chooses to login as an operator; 4. SACU 54 requests a user ID and password for Operator X; 5. Operator X enters their user ID and password; 6. SACU 54 authenticates Operator X; 7. Steps 4 through 6 are completed for the remaining number of operators that are required to be authenticated (as determined by the configuration of the SES 28); and 8. The authentication process is completed and the operator menu is presented to the user. For example, if the number of operators required to be authenticated is two (2), then the operator menu will not be presented until any two operators have been successfully authenticated.

In the present example, as noted above, user administration tasks are all performed using the SACU 54 program. There are two types of users for a SES 28: administrator and operator. Administrators have the privileges to add, revoke, reinstate and remove users of both types. Operators only have the rights to be able to change their account password.

Administrators can suspend a user's privileges, regardless of the privilege level of the target user. When a user's account has been revoked, the user will be unable to participate in any authentication process, disallowing the user from establishing a session with the SAC 53 (either through SACU 54 or through a client such as APMD 48). Revoking an operator should only be possible when the number of active users is greater than the number of operators required. Revoking an administrator should only be possible when the number of active administrators is greater than the number of administrators required. A user whose account has been revoked can be reinstated by an administrator. The reinstated account is then active, and the user can then participate in any of the authentication processes. Administrators can also remove a user's account, regardless of the privilege level of the target user. When a user's account has been removed, the user ID is deleted from the system. Removing an operator should only be possible when the number of active users is greater than the number of operators required. Removing an administrator should only be possible when the number of active administrators is greater than the number of administrators required.

The number of authenticated administrators required to perform administrative functions can be set during initialization. In some embodiments, it may be necessary to specify the minimum number of operators required to authenticate an operator session with the SAC 53. This number governs both the SACU 54 operator login process as well as the authentication of a SACD 56 client. For example, when this number is greater than zero, the SACD 56 requires operator authentication before it can start. When this number is set to zero, the SACD 56 can start with no authentication required. After successfully completing the administrator authentication process, the minimum number of required operators may be set. Listing the current users known to the SAC 53 can be useful in verifying which users are able to perform the operator and administrator authentication processes. This may be useful in user administration—if someone forgets their user ID, then other administrators can login, list the users and reveal the forgotten user ID.

SACU 54 may also provide an option to list the users, such that they are grouped by type (i.e. operator or administrator) and users whose accounts have been revoked are listed separately under "Revoked Administrators" and "Revoked Operators". Administrator privilege should be required to list the users of a SAC 53. Any user should be able to change their own password by providing their user ID and their current password and, if necessary by providing their smart card. Any operator password may be changed within an administrative session without requiring the operator's existing password. This provision enables an administrator to reset an operator password that has been forgotten. However, to ability reset a forgotten administrator password should be difficult or unavailable, since the smart card does not allow passwords to be reset for security reasons. In this case, other administrators can authenticate a session (i.e. gain administrator privileges), delete the administrator's account whose password has been lost, erase the user's smartcard and create a new administrator account for the user, in effect "resetting" their account.

The SES 28 may be designed so that in the event that the SES 28 suffers some form of disaster (e.g. hardware failure, power failure, crash), the system can continue to operate while the problem is resolved. During normal operation, when the primary SES's configuration changes, then the changes should be manually propagated to the secondary SES(es) 28. In the event the primary SES 28 fails, such that it can no longer operate, one or more secondary SES 28 units are used in its place. Prior to the primary SES 28 failing, the following facts should hold true: a) the secondary SES(es) 28 have their HSMs pre-loaded with the most recent primary SES 28 HSM backup; b) the secondary SES(es) 28 are pre-configured with the most recent primary SES 28 configuration data; and c) the secondary SES(es) 28 are always on and always active. After the primary SES 28 has failed, the following should be true: the secondary SES(es) 28 are still active and can accept client requests.

SES Upgrades and Updates

The following summarizes upgrading APMD 48 and SACD 56 software as well as SACE 58 (FM on the HSM used by SES 28). Detailed instructions regarding such upgrades will typically vary based on the application. To update the APMD 48, the following steps may be taken on both SES 28 systems: 1. Make a backup copy of the APMD 48 directory and APMD script; 2. Unzip the AMI update archive; 3. Unzip the SS-APMD archive found inside; 4. Enter the newly created directory; 5. Run the APMD install script; 6. In some updates, the format of the configuration file might change, thus the sample file in the distribution should be checked and if there are new or changed settings, such changes should be incorporated; 7. Start APMD 48 by issuing the start command.

For a SACD 56 software-only update, the following steps may be completed on both SES 28 systems: 1. Make a backup copy of the directory and script; 2. Make sure the latest SACE 58 backup is available for the current set of administrators as a precaution; 3. Unzip the SAC update archive; 4. Unzip the SACD 56 archive found inside; 5. Enter the newly created directory; 6. Run the install SACD 56 script; 6. Incorporate any formatting or setting changes; and 7. Start SACD 56 using a start command.

For an update to the SACE 58, the following steps may be completed on both SES 28 systems: 1. Stop APMD 48 by entering a stop command; 2. Stop SACD 56 by entering another stop command; 3. Log into SACU 54 with administrator credentials; 4. Select Upgrade SACE 58; 5. A tool the performs the following: i) Request the path of the encrypted upgrade data; ii) Request a passphrase to decrypt the upgrade data; iii) Create an encrypted backup of current HSM data in system RAM and on the HDD; iv) Export SAGE logs to syslog and the screen; v) Update the HSM software; vi) Request administrator keycard authentication again; and vii) Restore the encrypted backup from RAM. In the unlikely event of system failure or power outage during this process, the trusted entity can assist in upgrading manually and re-loading the precautionary backup with the help of the administrators. Finally, the following steps are performed to complete the process: 6. Start SACD 56 by entering a start command; and 7. Start AMPD 48 by entering another start command.

Application Protocol Module (APM)

As noted above, the SAC 53 is the component of the SES 28 that interfaces with the HSM card to process signature requests. The SAC 53 should not be directly accessible by the CE 26. Any requests received by the SAC 53 should instead be transmitted through the APMD 48, which is a customer/client/application specific agent of the SES 28 that allows the CE 26 (for that customer/client/application) to have signature requests fulfilled by the SAC 53. The APMD 48 is the SES 28 component that is exposed to clients. The APMD 48 is a customized client of the SACD 56, which manages the CE 26 requests for signatures and encryption.

The CE 26 sends requests to the APMD 48 to sign command messages that are to be sent to the meters 20. The signatures allow the meters 20 to verify that the command messages received are from a trusted CE 26 before executing the instruction. The CE 26 can also request that the APMD 48 encrypt the command messages before sending them to the meters 20. The command messages may need to be protected through encryption when they are relayed to the meters 20, if sensitive information is contained in the message 14 payload.

The APMD 48 is a process that listens for, and responds to, commands from the CE 26. The APMD 48 relies on both the DKUS 30 and the SACD 56 for performing services that are requested by the CE 26. When the APMD 48 starts, it reads its configuration file to establish the communication settings to use with the DKUS 30 and the SACD 56 (e.g. the port on which to listen for commands), as well as other configuration settings. These settings are specified in the APMD 48 configuration file (noted above). The APMD 48 receives keying information from the DKUS 30. Upon receipt, the APMD 48 uses these key labels in signature requests sent to the SAC 53 via the SACD 56. The SAC 53 will then perform the signature operations using the key whose label matches that requested by the APMD 48. The system keys are used to encrypt the signed messages. This following details how the CE 26 interacts with the APMD 48, illustrates an example use of the APMD 48, and further detail concerning the APMD 48 configuration file components.

When the CE 26 requires a message to be signed and encrypted, it prepares a request containing the message and optional parameters (e.g. whether to use the revocation key to sign the message, meter-specific identity, and encryption overrides). When a sensitive operation (e.g. a public key update) is being performed on the meter 20, the CE 26 requests that the message be signed using the Revocation Key instead of the Command Key. This is done by initiating a flag in the request to the APMD 48. If a message is required to be encrypted using the active system key, then the CE 26 does not populate the meter identity in the request, which implicitly indicates that the message is to be encrypted without referencing a specific meter 20. When the meter identity is populated in the request, the APMD 48 realizes that the message is to be encrypted using the active meter key and forwards the information to the DKUS 30. The DKUS 30 then looks up the keying information for the given meter 20, encrypts the message and returns the encrypted message to the SES 28 for further processing.

Whether a message 14 should be encrypted is governed by a system setting, which is managed by the MSK program in the DKUS 30 (i.e. enable/disable encryption). It is possible for the CE 26 to override this setting by raising the appropriate flag in the APMD 48 request. The CE 26 may choose to use the default encryption setting, force the encryption of the message, or require the message to stay unencrypted. In all cases, the message should be appropriately signed.

The control of the APMD 48 process may be handled through an initialization script. The supported switches to the initialization script are: start, stop, status and restart. Running the script with no arguments displays the program's usage message. The user can start the APMD 48 by executing an appropriate command. Only one instance of the APMD 48 should be able to be started using the initialization script. The script may thus create a lock file for the running instance of the APMD 48, which prohibits other instances of the APMD 48 from starting. When the APMD 48 is running and there is an attempt to start another instance of APMD 48, the initialization script will output to the screen a message indicating that the APMD 48 cannot start.

Starting the APMD 48 may also fail if the port number that the APMD 48 uses to receive messages has already been taken by a different process. When this occurs, the port conflict should be resolved before attempting to start the APMD 48. In all other cases, the APMD 48 should successfully start, regardless of the conditions of the system (e.g. SACD 56 is not running, DKUS 30 is unreachable, etc.). If the minimum conditions required to start the APMD 48 have not been met, the APMD 48 responds to CE 26 requests with error messages, which may be used for troubleshooting.

A user can check the status of the running APMD 48 service by entering a suitable command. A PID may be provided in the output, which is the process ID of the running APMD 48 process. In the event where the APMD 48 is behaving abnormally and needs to be terminated, then this PID may be used to terminate the process.

The APMD 48 configuration file may be broken down into sections. For instance, the section that defines the various section names of the configuration file is the SACD section, which defines the configuration section names for each of the SAC 53 components being used on the SES 28. The APMD 48 configuration file may have mandatory and optional sections. Within each section (whether mandatory or optional), individual parameters themselves may be mandatory or optional. When a section has a setting that is mandatory, that parameter is present for the configuration file to be valid.

Signing Appliance Core

As discussed, the SAC 53 is the component of the SES 28 that interfaces with the HSM card to process signature requests. The SACD 56 is a process that listens for, and responds to, commands from the APMD 48. The SACD 56 is configured using the settings specified in the SACD 56 configuration file. One value set by the configuration file is the port number that SACD 56 listens on for APMD 48 connections.

As noted above, the SAC 53 can be utilized via the implementation of a project-specific APM to meet unique customer needs. Following is a detailed discussion of the SAC 53. Although shown herein in the context of secure metering, it will be appreciated that rather than recreate the code required to implement each signing appliance, in other applications, a generic SAC 53 may be implemented, which can be customized based on the particular needs of a client/application.

In the following example, a group of operators may invoke SACD 56 and SACU 54 using their unique handles and associated passphrases (the number required is configurable), a group of administrators may elevate SACU 54 privileges to perform sensitive operations, and both administrators and operators may be considered users.

The SAC 53 infrastructure comprises four end-user components, namely a Client Library (SACCL 50), Daemon (SACD 56), Engine (SACE 58), and Administration Utility (SACU 54); one deployment and recovery component, namely a De-initialization Utility (SACDI 62); and three supplier components, namely a SACE Packaging Tool (GSPDL), Signing Appliance Client Sample (SACLIENT 52), and Internal SACE Test Harness (SLAPPER 60). The GSPDL may be used to package up HSM software (also referred to herein as the FM or SACE), into an encrypted image that can be shipped to customers. The SACU 54 can then take this image, along with a password, and load the FM onto the HSM. This enables upgrades to the HSM software out in the field.

The SACCL 50 is used by APMs to encode service requests for an SACE 58 through a SACD 56. The SACD 56 is a thin layer which translates messages from the SACCL 50 and converses with the SACE 58 for processing. Once running, the SACD 56 listens for SACCL 50 requests, translates them and queues them for service by an SACE 58. Application logic may be embedded in an APM to distribute requests to several SAC 53 systems to balance load, and the SACD 56 can be configured to communicate with multiple SACEs 58 (useful in a host with multiple HSMs).

The SACU 54 can be a command line utility which interacts directly with the SACE 58 to perform administrative tasks. The SACDI 62 is used to revert an established SACE 58 back to its original state. This is often employed at the time of distribution, after some pre-shipping testing has completed. It removes data and traces of use before the end-user receives the appliance.

The SACLIENT 52 may be used as a demonstration tool for both developers and testers. It is capable of requesting signatures (among other things) from a SACD 56 and makes use of the SACCL 50. The GSPDL is used to package and encrypt an SACE 58 upgrade image for delivery to the end-user or deployment agent. This allows for distribution of SACE 58 binaries without risking exposure of sensitive code. The SLAPPER 60 is a utility which interfaces with the SACE 58 directly to perform black box testing on the SACE's extensive API. It can be scripted for maximum flexibility, and includes facilities to test performance. It may be noted that the APM 44 and SAC 53 hosts may be the same physical machine, and that multiple SACE 58 and SACD 56 configurations are possible although not depicted.

The SACCL 50 is a binary shared object (DLL) which is compiled for multiple platforms. The SACCL 50 provides encoding of SACD 56 requests and decoding of SACD 56 responses. The SACCL 50 is called by a customer specific APM 44 (or some other agent) which translates high-level customer requests to low-level SACE 58 requests. The SACCL 50 encodes and the APM 44 forwards these translated messages to a SACD 56 which in turn encodes requests for a SACE 58. The SACE 58 returns a response to the SACD 56, which is decoded and translated into a response that is sent to the APM 44. The APM 44 finally calls the SACCL 50 to decode the received response. The SACCL 50 should be thread-safe to allow concurrent interaction from a calling process.

The SACD 56 provides an interface for an SACCL-equipped agent to request service from an SACE 58. It can be implemented as a server daemon which is configurable to listen on a given port and interface for socket connections and may be built across various platform architectures. The SACD 56 features include: translation of SACCL 50 requests and responses to and from an SACE 58 configurable SSL support, and a signed configuration file dictating its behaviour. The SACD 56 can respond to requests for: signatures, verifications, public keys, entropy, and timestamps. The API exposed by the SACE 58 is detailed below. The above requests are ultimately serviced by the SACE 58, which retains the right to allow or disallow service.

The SACE 58 can be considered a central component of the SAC 53. All sensitive data should be managed by the SACE 58, and all sensitive operations should be performed by the SACE 58. The SACE 58 is intended to run in a secure environment such as an HSM, however it is constructed in such a way that it can run in host memory for ease of development and debugging. The SACE 58 provides several features, including: key management, session management, user management, secure cryptography, entropy, secure logging, secure timestamp, secure backup/restore, secure upgrade, and secure de-initialization. As the SACE 58 needs to store persistent data, it requires access to a non-volatile (and preferably secure) File System (FS). This FS will house databases for keys, user data and audit logs. When a SAC ships to a client, the SACE 58 can be locked with a one-time passphrase. On first use, an initial group of administrators of the SAC system inputs the SAIP as exemplified above which can be created randomly during assembly.

The initial group of administrators may create a new wrapping key (WK) or secret, or import an existing backup of SACE 58 data. The WK identifies the group of administrators and provides a way to export sensitive data (such as key and recovery data) in encrypted form. The WK stored in the SACE 58 is backed up to hardware tokens. This provides a way to recover from disaster scenarios. After initialization, a group of operators may be designated for future PL2 authentication. If any step in this process fails, the SAC 53 reverts back to the locked state and may then request entry of the SAIP again. This is necessary to ensure a group administrators exists to issue future administrative commands to the SACE 58.

Keys are stored in a database on the SACE 58. Usage information is optionally tracked on a per-key basis. The keys are protected based on attributes which are fixed at the time of generation. The following key types are supported by the SACE 58 in this example: ECC, RSA, and AES. The SACE 58 generates keys internally at an administrator request. Keys are identified by a unique label which is provided as input at the time of generation. In the case of RSA and ECC keys, one label will refer to both the private and public key if both are present. A mechanism may exist by which individual keys can be exported and imported into the SACE 58. Sensitive keys are exported using a derivation of the WK.

At the time of generation, attributes may be assigned to keys which dictate how they may be used. Attributes that may be assigned to keys include: Hidden—the key may not be listed; Admin—the key (private or symmetric) may only be used by administrators; Static—the key cannot be deleted; Local—the key cannot be exported; and Sensitive—the key (private or symmetric) cannot be exported in the clear.

In addition to the WK, there may exist a unique signing key pair, which is generated during one time initialization. This key can be tagged with all attributes. In other words, the keys can have multiple attributes which affect how they work, e.g. whether or not they can be exported off of the HSM.

To provide control over which features of the SACE 58 are accessible to a consumer, a notion of privilege exists. Some commands (very few) require no authentication, while the rest require operator or administrator authentication. The SACD 56 or SACU 54 attempts to establish a session by sending a message to the SACE 58. A session is established if the SACE 58 is in normal operation. A session context is maintained internally by the SACE 58, and is referenced externally by a Session Identifier (SID). This SID is bound to the Process Identifier (PID) of the calling process (normally the SACD 56 or SACU 54, but during testing, also the SLAPPER 60). Only that PID is allowed to request service based on the context's SID. Sessions have an associated timeout value, based on privilege level. Administrator and default sessions should out quickly (5 minutes is reasonable), while all operator sessions may time out after a longer period of time (perhaps one week). This allows applications such as SACD 56, which may be idle for longer, to keep a session open with the SACE 58. Administrator sessions time out in the interest of security with session hi-jacking in mind, and default sessions time out quickly for cleanliness (a default session should really only exist for a matter of minutes, until proper authentication has been provided to elevate privilege level).

As a convention, Privilege Level 0 (PL0) can be designated as the most powerful level, and numerical increases in privilege level decrease logical privilege (similar to the protection ring concept). Some unique privilege levels exist solely to facilitate special operations such as SACE 58 initialization and modification of the required number of administrators. During these processes, only specific API calls relevant to the operation associated with the level are allowed. Once a session is established, privilege level is elevated by providing appropriate authentication. For example, if a session begins at PL3 (default), a group of operators can provide credentials to elevate to PL2 or a group of administrators may elevate privileges to PL1. All standard commands are then available using the associated context. A process may request a decrease in context privilege level (an increase in numeric value) at any time, without additional authentication. In the present example, since sessions do not need to persist across consecutive running instances of the SACE 58, there is no need to store this session information in the SACE 58.

User information is stored in an undefined form of database. This database should track the following information: user names, operator passphrase hash digests, relevant administrator share data, and account status. To elevate an SID from PL3 (default) to PL2, n operators are required to provide their credentials, where n∫Z, n≥0 is configurable by a group of administrators. If n=0, the privilege level immediately jumps to PL2 when a session context is created. Administrator access can be controlled by two-factor authentication. The two factors are a passphrase (knowledge) and a physical token (possession). During SACE 58 initialization, a random secret—the Wrapping Key (WK)—is generated and split using a zero-knowledge secret sharing algorithm. A set of N (N∫Z$^+$, 7≥N≥1) shadows is created, where N are required to reconstitute the WK. Each shadow is encrypted using a password-based encryption algorithm and is written to a removable hardware token. The passphrase is chosen by the administrator that owns the token.

The WK is stored on the SACE 58 for verification during reconstitution. After a set of N tokens and shares exist, additional tokens may be created via an administrative command. With a total of M≥N tokens, any N tokens may be used to elevate an SID to PL1.

Cryptographic operations take place entirely in the SACE 58 memory space which should be adequately protected to support the claim that the operations are performed securely. Supported operations should include: encrypt, decrypt, sign, and verify. The API should be minimal; internal wrappers should determine which implementation to use based on the key type and size the label references. In the case of ambiguity—for example, when ciphering using an asymmetric key label—the default action is public encryption and private decryption. A flag may be specified to override this behaviour.

The SACE 58 is capable of generating entropy. This is useful when the SACE 58 has access to a good hardware RNG, and interfacing applications need a good seeding source for their respective PRNGs.

The SACE 58 logs security relevant operations (logins and administrative operations) to its local FS. An interface is exposed to allow collection of these logs and subsequent purge of logs on the SACE 58 FS. The logs should persist across de-initialization and re-initialization to maintain an audit trail of such events.

The SACE 58 is capable of returning a timestamp from a known good source. For example, most HSMs have an RTC which is tamper-evident. The SACE 58 also provides a secure mechanism by which the SACE 58 RTC can be set or synchronized with an external source.

The SACE 58 is capable of generating two types of backup—key backups, and complete SACE 58 FS backups (possibly excluding log information—as one wouldn't want to overwrite the existing log data during a restore operation). Similar to the key backups, FS backups are encrypted using a derivative of the WK, and it is possible to restore an SACE 58 from such a backup during initialization (useful for both disaster recovery or cloning to provide redundancy) or as an admin operation on an existing SACE 58. A restoration performed on an existing SACE 58 only completes successfully if the backup is an image of the same instance of SACE 58 (the random WK must match in the current SACE 58 and backup image). If a restoration is attempted and the administrator set which authenticated to authorize the restoration is not a valid set of administrators within the backup image, the restoration may be denied. This ensures that backups are kept up to date. An initialization restoration should guarantee that the authenticating administrators are allowed to authenticate within the backup image. It should not be possible to perform an initialization restoration without the prior authentication of the required number of administrators, since it should be impossible to decrypt the backup image without the WK shared on the administrator tokens.

The SACE 58 FS backups may also created in such a way that the actual encryption is wrapped with both the WK and the public portion of an asymmetric key. This allows a trusted third party to hold the private piece securely, only to use in the event that enough administrator tokens are destroyed or lost to prevent the successful reconstitution of the WK.

If possible (i.e. hardware permitting), the SACE 58 may require that administrator authentication take place before allowing its own software to be upgraded.

A method may be employed to return a SACE 58 to its factory state, where it contains no data or key information. As previously described, this process should not erase the secure audit log. Only user, key and configuration data should be eliminated.

The SACU 54 is designed using cross-platform toolkits. It interfaces directly with the SACE 58 to provide an administrative interface to most features the SACE 58 provides. The notable exception is de-initialization.

The SACDI is responsible for removing all data except audit log information from the SACE 58, after enforcing administrator authentication. It returns the SACE 58 to a fresh state and is suitable for use after quality assurance testing, before deployment at the end-user site.

The GSPDL (packaging tool) creates an encrypted payload suitable for use during the SACE 58 upgrade process. It uses key components internal to the SACE 58.

The SACLIENT 52 should at least be able to request signatures from a SACD 56 using the SACC 50L. It may also support options to exercise the entire SACD 56 API, as well as provide some benchmarking numbers during the process.

The SLAPPER 60 interacts directly with the SACE 58 to exercise its API, performing black-box positive, negative and stress testing.

The following discusses various computer executable instructions that may be implemented for using the SACD 56 and an explanation of the SACD 56 configuration file components. It may be noted that a SACD 56 configuration file should be signed before it is used by SACD 56. Such a signature is generated by using a sign SACU 54 command, described in further detail below. The control of the SACD 56 process is handled through an initialization script. The supported switches to the initialization script are: start, stop, status and restart. Running the script with no arguments displays the program's usage message. Starting SACD 56 can start the SACD 56 by executing an appropriate start command as root. Only one instance of SACD 56 should be started using the initialization script. The script creates a lock file for the running instance of the SACD 56, which prohibits other instances of SACD 56 from starting. When SACD 56 is running and there is an attempt to start another instance of SACD 56, the initialization script should output to the screen an appropriate warning message. Starting the SACD 56 may also fail if the port that the SACD 56 uses to receive messages has already been taken by a different process, the signature file for SACD 56 configuration file is missing or if the HSM is not responding. When these situations occur, then the port conflict should be resolved, a configuration file signature should be created, or the HSM should be rebooted, respectively.

Also, if the SAC 53 has not been initialized (i.e. the steps from "Initial Startup" have not been performed), then SACD 56 may be unable to perform any operations and will report errors when trying to establish a session with the HSM. In situations where the HSM is unresponsive, the HSM can be rebooted.

In all other cases, the SACD 56 should successfully start, regardless of the conditions of the system (e.g. no signing keys in the SAC 53). If the minimum conditions required to start the SACD 56 have been met, but the SACD 56 cannot perform the requested operation, the SACD 56 responds to APMD 48 requests with error messages, which are relayed back to the CE 26. Additionally, the APMD 48 will return messages that the SACD 56 cannot be contacted in cases where the SACD 56 cannot start.

The PID mentioned in the output is the process ID of the running SACD 56 instance. In the event where the SACD 56 is behaving abnormally and needs to be terminated, then this PID may be used to terminate the process. If a SACD 56 process doesn't exit cleanly (e.g. the process is terminated), then the status may be reported. If this occurs, use the initialization script to stop the SACD 56, which will also clean up the lock file. If the program ended unexpectedly, it is important to investigate why this occurred.

The user can request that the SACD 56 process stop and exit cleanly by executing an appropriate stop command. Performing a SACD 56 status request after stopping the service should result in output that indicates the SACD 56 has stopped. The user can restart the SACD 56 process by executing a restart command. The "restart" switch is a single-shot command that is particularly useful for having the SACD 56 use updated configuration settings.

The SACD 56 configuration file is broken down into sections. For instance, a section that defines the various section names of the configuration file may be found. This section defines the configuration section names for each of the SAC 53 components being used on the SES 28. There are three components whose configuration may be defined in the SACD 56 configuration file: net, SSL, and trace. The file has mandatory and optional sections. Within each section, individual parameters themselves may be mandatory or optional.

When a section has a setting that is mandatory, that parameter must be present for the configuration file to be valid.

The following outlines several example commands that may be used with the SACU 54.

Initialize SAC—This is the first option available through SACU 54 on the initial startup of a SES 28. The initialization includes the creation of a backup key, local signing key, operator and administrator accounts and keycards. Alternatively, the initialization of a SES 28 can comprise using an existing keycard set to be used to import an existing, encrypted SAC 53 image.

Backup SAC—This command creates a backup of the SAC 53 which is encrypted using the backup key and exported to a file.

Restore SAC—This command performs a restoration from an SAC 53 backup, overwriting the contents of the current system with the contents of the backup. It may be noted that logs should not be overwritten.

Synchronize SAC—The SAC 53 houses a hardware real-time clock (RTC), which may be used for precise timestamping. The RTC can be used without fear of tampering, since the RTC is set/synchronized with a trusted time source, and requires a minimum of operator-level authentication to do so. The time source used for synchronization is the local system time. The accuracy of the local system time can be ensured by synchronizing it with an NTP server prior to synchronizing the SAC's RTC. The user should ensure that the SAC remains NTP-synchronized by periodically comparing the SAC's RTC time against that of an NTP-synchronized system. These checks enable you to prevent any possible drifting of the SAC's RTC time from the NTP-synchronized time. The user can also synchronize the SAC 53 RTC with the host's real time clock in any suitable manner.

Figure 7:
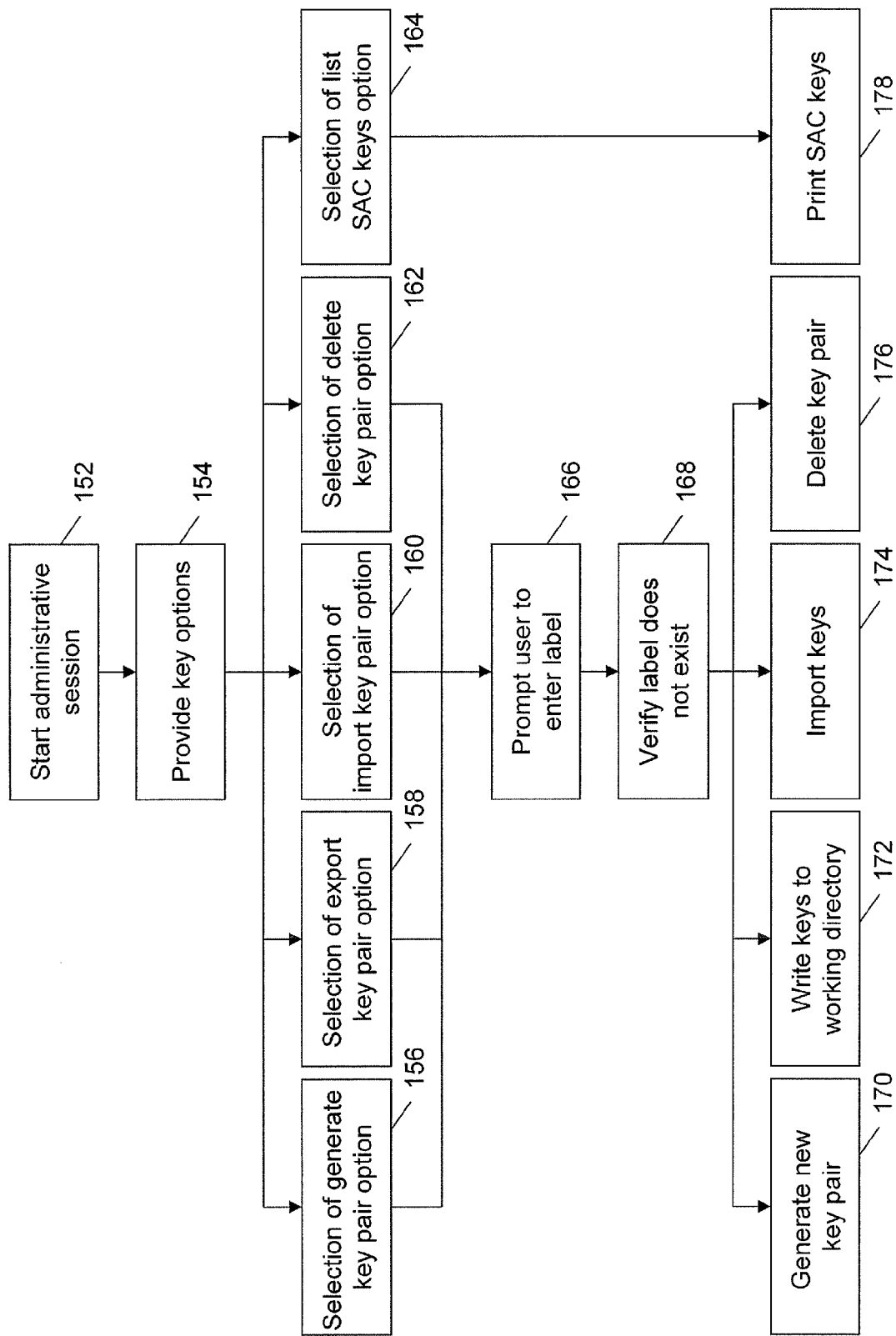
FIG. 7 is a flow diagram illustrating various use cases for performing key operations.

Generate Key Pair—The SAC 53 generates a set of signing keys before it can process signature requests. When a set of signing keys is generated, a label is provided for the key pair. Signature requests then use the label to specify which key should be used to perform the signature. It may be note that key pair labels can be restricted to being a minimum of, e.g. 3 characters and a maximum of, e.g. 255 characters. As shown in FIG. 7, a signing key pair can be generated by performing the following operations: 1. Start an administrative session at 152 and provide key options at 154; 2. Choose the "Generate Key/Keypair" option 156 from the SACU 54 menu; 3. SACU 54 prompts user to enter a label for the key pair being generated at 166; 4. SACU 54 verifies that the label doesn't already exist at 168; and 5. generates a new key pair at 170.

Export key/Key Pair—This command exports the keys (both the private and public key, into .pri and .pub files, respectively). The .pri file will be encrypted using the backup key and contain both keys, while the .pub file is a plaintext PEM/DER-encoded public key. SACU 54 allows the exporting of signing key pairs from the SAC 53. The process of exporting signing keys comprises exporting the public key part of the key pair in PEM-encoded format, and exporting the private key part in an encrypted format. The private key is encrypted using a secret backup key that is stored within the administrators' smart cards, which provides for disaster recovery without requiring the private key to be stored in plaintext. The private key can be imported into the SAC 53 at later time, if necessary, by decrypting it using the secret backup key. It is recommend that the user not rename the exported key files, since the importing process checks the imported key label against that of the name of the key file. As also shown in FIG. 7, the user can export a key pair by performing the following steps: 1. Start an administrative session at 152; 2. Choose the "Export Key/Keypair" option 158 from the SACU 54 menu; 3. SACU 54 prompts user to enter a label for the key pair to be exported at 166; and 4. SACU 54 verifies that such a label exists on the SAC 53 at 168. Once verified, the public and private keys are written to the working directory as label.pub and label.pri, respectively at 172.

Import key/Key Pair—SACU 54 allows the importation of keys that were previously exported from the SAC 53. These keys are stored in .pri files, which SACU 54 reads from the working directory, based on the key pair label. The file is then passed to the SAC 53, which decrypts it using the backup key, and stores it on the SAC's FS. It may be noted that the import process verifies that the filename of the key is the same as the label of the key stored within it. For example, when importing a key from the file Key1.pri, a key labeled "Key1" is expected to be retrieved. For this reason, renaming key files is not recommended. As also shown in FIG. 7, a key pair can be imported by performing the following steps: 1. Start an administrative session at 152; 2. Choose the "Import Key/Keypair" option 160 from the SACU 54 menu; 3. SACU 54 prompts user to enter a label for the key pair to be imported at 166; and 4. SACU 54 imports the public key from label.pub and the private key from label.pri at 174.

Delete key/Key Pair—SACU 54 allows the deletion of a signing key pair from the SAC 53. The key label is used to determine which key pair is to be deleted. A key pair that has been deleted can only be restored if it was exported and backed up prior to the deletion. Unless the SAC 53 has run out of space to add new keys, there is no need to delete key pairs. However, key deletion can be used to verify that exported keys can be successfully re-imported. For example, it may be good practice to generate, export, delete and import every new key pair—ensuring that you both have a backup of the key and that it can successfully be restored to the SAC 53. As also shown in FIG. 7, key pairs can be deleted by performing the following steps: 1. Start an administrative session at 152; 2. Choose the "Delete Key/Keypair" option 162 from the SACU 54 menu; 3. SACU 54 prompts user to enter a label for the key pair to be deleted 166; and 4. SACU 54 deletes the key pair label from the SAC 53 at 176.

List SAC keys—SACU 54 provides administrators with the ability to compile a list of keys currently stored in the SAC 53. The keys are printed to the screen as a list of key labels. A good practice is to list the SAC keys after a key has been created/deleted to ensure that the list of key labels matches the operation that was performed. As also shown in FIG. 7, the current SAC keys can be listed by performing the following steps: 1. Start an administrative session at 152; and 2. Choose the "List SAC Keys" option 164 from the SACU 54 menu. The current list of keys are then printed to the screen at 178.

Change password—This command changes the password for a specified account (either operator or administrator). To change the password of an administrator account, the key card for that account should be required.

List users—This command lists the IDs of all operators and administrator accounts on the SES 28.

Add operator—This command adds a valid operator to the SES 28.

Add administrator—This command adds a valid administrator to the SES 28.

Revoke user—This command revokes the specified user account.

Remove user—This command removes the specified user account.

Set required operators—This command sets the required number of operators to be authenticated before operator-level commands can be issued.

Figure 8:
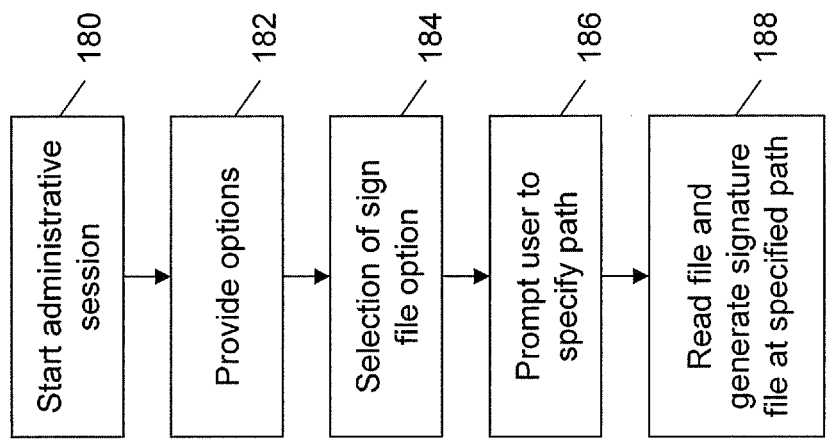
FIG. 8 is a flow diagram illustrating a use case for signing a file.

Sign config file—This command creates a file signature for the specified file (filename), storing the signature in a new file, filename.sig. The signature is performed using the signing key created during SES 28 initialization. This functionality is used to sign the SACD 56 configuration file, sacd.conf. Prior to launching, SACD 56 performs a signature verification to ensure the integrity of the configuration file. As shown in FIG. 8, a file may be signed by performing the following steps: 1. Start an administrative session at 180; 2. Choose the "Sign File" option 184 from the SACU 54 menu of options provided at 182; 3. SACU 54 prompts user to specify the path to the file to be signed (either absolute or relative) at 186; and 4. SACU 54 reads the file and generates a signature file (filename.sig) at the same path as the file being signed at 188.

Figure 9:
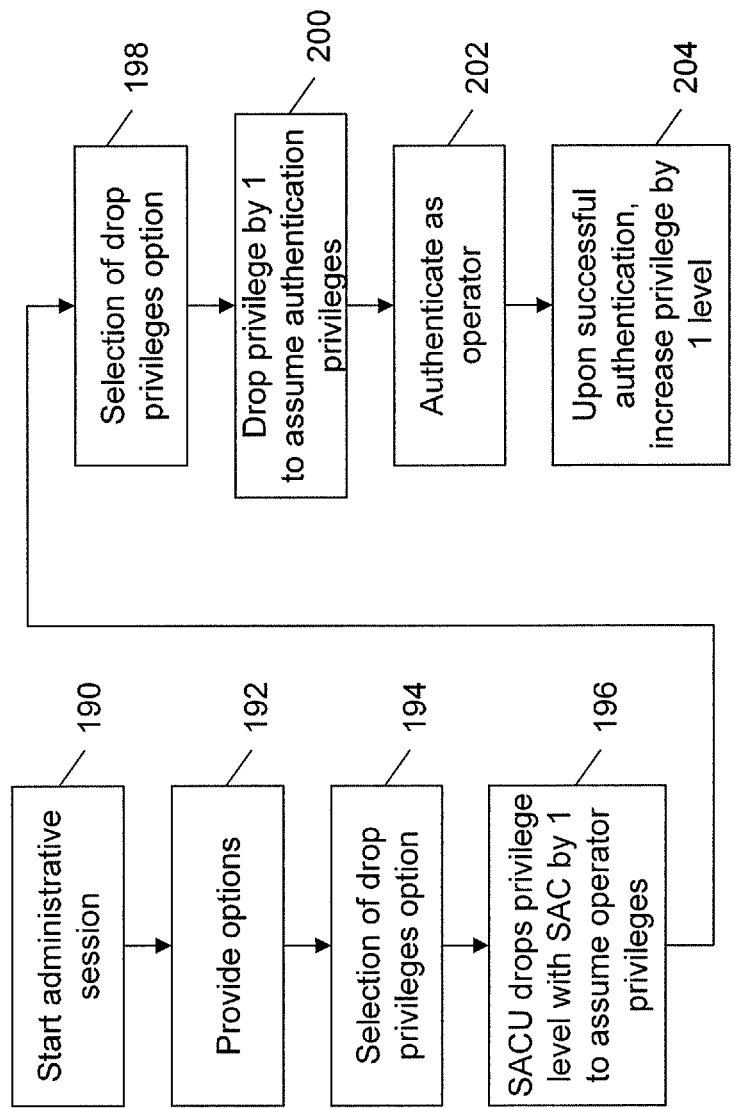
FIG. 9 is a flow diagram illustrating a process for modifying privileges for an operator.

Drop privileges—The SAC controls the access available to client sessions through the concept of privilege levels. When an unauthenticated client connects to the SAC 53, it is granted the lowest privilege level, allowing the client to only perform authentication operations with the SAC 53. After a successful authentication has been performed, the privilege level of the client increases to the level of authentication that was completed (i.e. either operator or administrator privileges are granted, depending on the authentication type). The following sequence of steps demonstrates how a user gains administrator privileges, which is the highest level of privilege on the SAC 53. The example then demonstrates how a user can then drop a level of privilege, to have operator privileges, by choosing "Drop Privileges". The example then has the user drop down a further level, to the lowest level of privilege—authentication privileges. The example shown in FIG. 9 then demonstrates the user climbing up one authentication level, to operator privileges, by authenticating as an operator: 1. Start an administrative session at 190; 2. Choose the "Drop Privileges" option 194 from the SACU 54 menu providing options at 192. 3. SACU 54 drops its privilege level with the SAC 53 by one to assume operator privileges at 196; 4. Choose the "Drop Privileges" option from the SACU 54 menu at 198; 5. SACU 54 drops its privilege level with the SAC 53 by one to assume authentication privileges at 200; 6. Choose to authenticate as an operator at 202; and 7. Upon successful authentication, SACU 54 increases its privilege level with the SAC 53 by one level to assume operator privileges at 204.

Export secure logs—This command exports the secure logs to syslog. These are the logs found on the HSM, which log admin operations. The logs may be exported by performing the following steps: 1. Start an administrative session; 2. Choose the "Export Secure Logs" option from the SACU 54 menu; and 3. The logs are exported to syslog.

Decryption and Key Update Server

The DKUS 30 infrastructure provides a system to manage system and meter keys, and to decrypt messages received from meters 20. It also provides a way to add and authenticate meters 20 to the system using a challenge-response mechanism. Messages from meters 20 are decrypted by the DKUS 30 using meter-specific AES keys which are stored in the DKUS 30 key database 66. Authentication messages are generated by the DKUS 30 by way of ECIES encryption using meter-specific ECC public keys. The DKUS 30 in the embodiment shown comprises the following components: Client Library, DKUS daemon (DKUSD) 64, ManageSolutionKeys (MSK) 68—command line configuration application, ManagerMeterKeys (MMK) 70—command line configuration application, and PostgresQL database 66. Communications between these components, as well as details of the components themselves are described later.

There are two fundamental types of data to back up on the DKUS 30: the system configuration data, and the key database 66. Both configuration data and the database 66 itself are stored (in plaintext) on the host file system, and can be backed up manually by copying to a designated secure location. The database can also be configured to support automatic replication of data to a passive backup system. Restoration is a matter of copying the backup data to the new host system; if a database replication backup system is used, the database will need to be switched over to an active state to be operational as a primary DKUS 30. For disaster recovery, two systems are shipped as shown in FIG. 3, comprising a primary (active) and backup (passive) DKUS 30. The backup DKUS 30 is setup such that the DKUS 30 server application is not executing, but has been pre-configured with appropriate settings to enable immediate operation after start-up, should a disaster occur.

The database on the backup DKUS 30 should always be executing (even when the DKUS 30 application is not), and is configured so that it automatically and constantly replicates the primary DKUS 30 database—this database configuration is considered to be in passive mode. If the primary DKUS 30 goes down, the backup DKUS 30 can be made to be the primary DKUS 30 by stopping the database, setting the database as active, then restarting the database and starting the DKUS 30 application. It may be noted that when the backup DKUS 30 becomes the primary, it is important to: ensure that the original primary DKUS 30 is no longer active, ensure that all clients are aware of the change so that they can communicate with the new DKUS 30, and shutdown, reconfigure, and restart the SES 28 so that it is aware of the new location of the DKUS 30.

Figure 10:
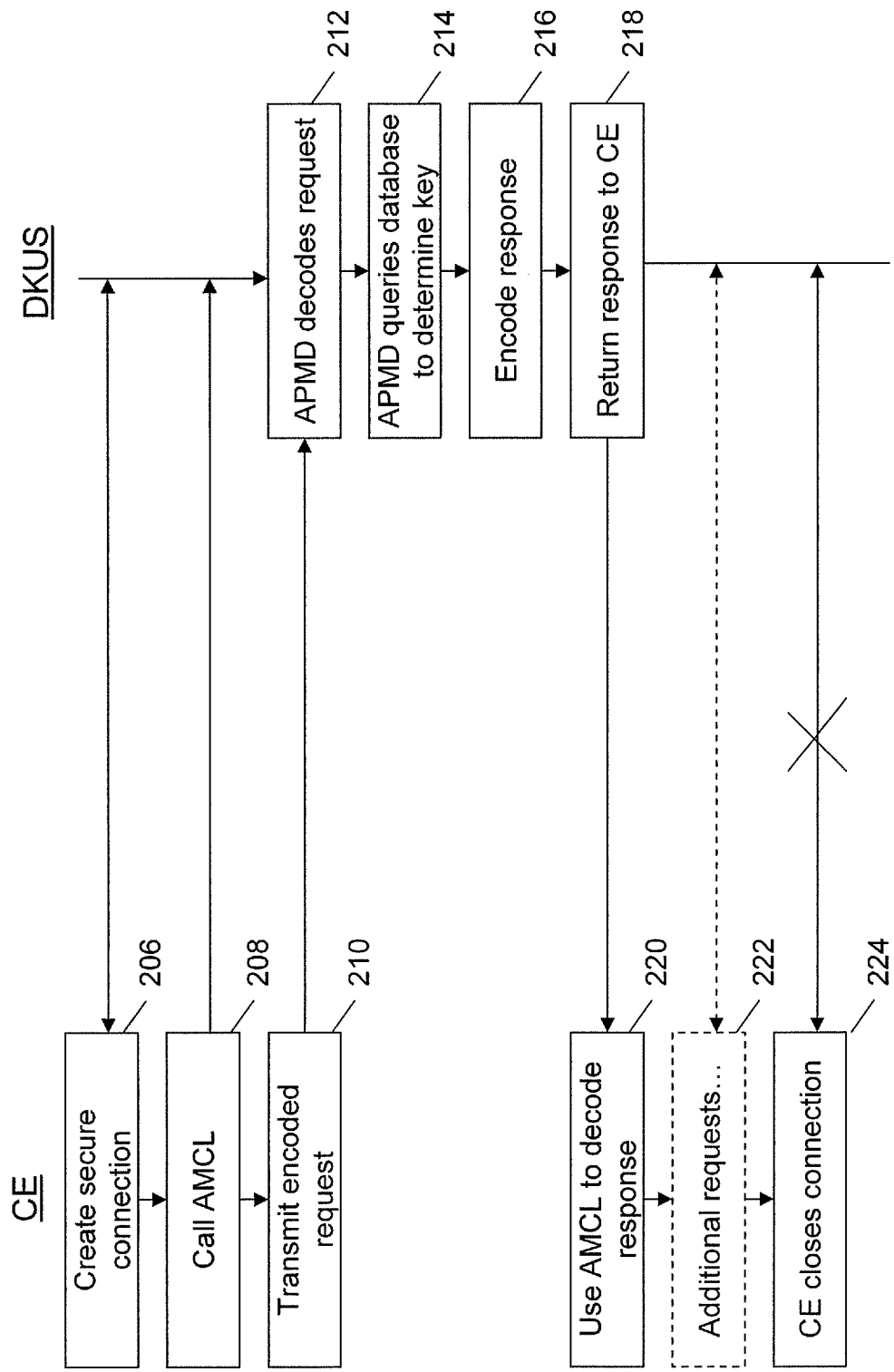
FIG. 10 is a flow diagram illustrating a communication process between the CE and the decryption and key update server (DKUS).

Referring now to FIG. 10, for communicating between the CE 26 and the DKUSD, the general data flow is as follows (note that simultaneous connections are allowed): the CE 26 creates an SSL socket connection with the DKUSD 64 at 202; the AMCL 42 is called by the CE 26 at 208 to encode a decryption request; the CE 26 transmits the encoded request to the DKUSD 64 at 210; the DKUSD 64 decodes the request at 212; the DKUSD 64 queries the database 66 at 214 to determine the key with which to decrypt the message; the DKUSD 64 validates the message using the key; the DKUSD 64 decrypts message using the key; the DKUSD 64 encodes the response, containing the decrypted message at 216; the DKUSD 64 returns the response to the CE 26 at 218; the CE 26 uses the AMCL 42 to decode the response at 220; all steps following creation of the secure connection may be repeated for additional requests as necessary at 222; and the CE 26 closes connection to the DKUSD 64 at 224.

The DKUSD 64 may be constructed as a Linux daemon which handles service requests by listening for incoming SSL connections. Before listening for requests, the DKUSD 64 reads a configuration file which contains information required to operate, such as network communication configuration for the client, as well as the database utilized by the DKUSD 64. After accepting an SSL connection with the CE 26, the DKUSD 64 listens for requests on that socket (and any other connected sockets). The requests will be decoded and queued. The DKUSD 64 then reads each message from the request queue and performs the corresponding operation. The results of each operation are returned to the CE 26 via the same secure socket, which completes the interaction. The DKUSD 64 interacts with a database for all key and data tables. All calls to the database are done through SQL messages, utilizing an API that provides all communication with the database itself.

The MSK 68 application initiates certain actions that require communication back to the CE 26. These communications are performed via calls from the DKUS 30 to specific Web Services on the CE 26 itself. These actions include: key rollover, replacing meter keys, replacing signing keys, and re-authenticating the meter 20. It may be noted that the MSK 68 application in this example communicates directly with the CE 26 Web Service, not through the DKUSD 64.

The MSK 68 utility is also used to perform various key operations on system wide keys, such as: set active key, restrict key state, show key state, enable/disable command encryption, override consistency requirements, generate new system shared key, import meter-specific public keys, load a command or revocation key, export public keys, rollover system shared key or group of standby meter keys, and update command or revocation key. The MSK 68 interacts directly with the database to perform most of these actions, and then informs the DKUSD 64 when necessary to update it on state changes. The MSK 68 is, in this example, a command-line application, compiled for the target platform (i.e., Linux in this example).

The MMK 70 utility is used to perform meter specific key operations, for an individual, or set of meters 20. These may include: force meter re-authentication, rollover standby meter key, update standby meter key, and delete meter key. The MMK 70 interacts directly with the database for certain actions, and then informs the DKUSD 64 when necessary to inform it that the database has changed. The MMK 70 may also need to communicate directly with the CE 26 as described above. The MMK 70 in this example is a command-line application, compiled for the target platform (i.e., Linux in this example).

The database 66 used for the DKUS 30 in this example is PostgresQL. Interactions with the database are done using SQL messages that are predefined using a schema. Schema are defined for the following data items: System Key State—each type of key in the system has a state associated with it, which is one of: active, standby, and empty; Meter Key State—each of the keys in a meter 20 have a state associated with them, which is one of: uninitialized, authenticating, failed, inconsistent, and consistent; Meter Table—this table maps meter ESNs to an internal meter ID identifier; and Key State Table—this table maps internal meter IDs to key slots to key states.

PostgresQL stores the database 66 and transaction logs in a specific directory on a mounted partition. For performance reasons, it is prudent to use a separate physical disk (or RAID1 set) dedicated solely to the database.

One of the functions of DKUS 30 is to manage the cryptographic keys used by the CE 26 and the meters 20 in their communications with each other. Several types of keys are used. The following key types are used in this example:

System key—The system key is used to encrypt command messages sent from the CE 26 to meters 20 on a system-wide basis (for commands sent to an individual meter 20, the meter key is used instead). This is a symmetric AES (Advance Encryption Standard) key. There is only one in-use throughout the system at any one time.

Command key—The command key is used to sign command messages sent from the CE 26 to meters 20, providing assurance that commands originated with the CE 26. This key is asymmetric, meaning that it is composed of a private key and a public key. The private key is known only to the SES 28, which performs signing operations. The public key is known to all meters 20 and used by them to authenticate signatures. This is an ECC (Elliptic Curve Cryptography) key. There is only one in-use throughout the system at any one time.

Meter key—The meter key is a unique key assigned to each meter 20 for the encryption of individual communications between it and the CE 26. The meter key is a symmetric key, i.e., the same key is used for both encryption and decryption.

Recovery key—The recovery key is a unique key pre-placed in each meter 20 at the time of its manufacture. It is used for encryption of other types of keys when sent to the meter 20. It is also used when the meter 20 first comes online and the CE 26 challenges it to prove its authenticity on the basis of this key. The recovery key is an asymmetric ECC key. The private component is known only to the meter 20. The public component is stored to a file by the meter manufacturer 34 and provided to DKUS 30 personnel to import into the system.

Revocation key—The revocation key is used to sign commands instructing a meter 20 to accept a new command key. The revocation key is an asymmetric ECC key. There is only one in-use throughout the system at any one time. The private part of the key is known only to the SES 28, which performs the signing operation. The public key is known to all meters 20.

Active and Standby Keys—DKUS 30 assigns multiple keys of each type to a meter 20, specifically, four meter keys and two of each other type of key. Only one of each type is in-use at any given time, called the active key; the others are standby keys and can be made active later. This framework allows keys to be updated smoothly. New keys are always sent as replacements for standby rather than active keys. After the meter 20 confirms successful receipt of the new key, a subsequent operation can make it active.

DKUS 30 is used in a framework comprising a CE 26, a client DLL, a SES 28, and a group of meters 20 being managed. DKUS 30 interacts with the other components in the following ways:

CE 26>Client API>DKUS 30—The CE 26 initiates requests to DKUS 30 using a client DLL hosted on the CE 26 platform. The client DLL does not connect to DKUS 30; it only packages commands in the format DKUS 30 requires. It is the responsibility of the CE 26 to transmit the encoded command message to DKUS 30, which is done over an SSL connection.

MMK 70, MSK 68>SOAP>CE 26—DKUS 30 and its bundled utilities should not communicate directly with meters 20. To pass a message to a meter 20, DKUS 30 components request that the CE 26 pass the message. To allow DKUS 30 components to contact it, the CE 26 exposes a SOAP web service interface.

SES 28< >DKUS 30—SES 28 relies on DKUS 30 to provide it with the current system keys, contacting DKUS 30 when it launches. Also, for meter-specific encryption operations, SES 28 contacts DKUS 30, requesting that it perform the encryption.

In the example shown in FIG. 4, the DKUS 30 comes with a PostgreSQL database 66 pre-installed and configured to launch automatically at system startup. For performance reasons, the database is mounted to its own disk partition under the root file system. The database contains a table for every meter 20 in the system. Each meter's table contains the following fields:

Key slots—These slots are available to hold the different types of keys used in the system: command key 1, command key 2, command key 3, command key 4, revocation key 1, revocation key 2, system key 1, system key 2, meter key 1, meter key 2.

Active or standby—For each of the above key slots, there is a field recording whether that key is currently in-use. The two possible settings are: active, or standby.

Meter state—Also recorded for each key slot is the meter state for that key, i.e., whether it has been confirmed that the meter 20 received the key. This field can be set to one of the following: consistent, failed, or uninitialized.

Communication between DKUS 30 and other components of the system is secured using the SSL protocol, which uses certificates containing public keys. A certificate for the DKUS 30 server needs to be obtained before it can be used. Certificate files need to be PEM-encoded, with the certificate data placed before the public key data. The name of the file used is determined by a setting in the configuration file. Along with the certificate file, the system also needs to provide a PEM-encoded file defining trusted CAs (certificate authorities). Again, the filename is specified in the configuration file.

DKUS 30 uses an INI-style configuration file to set options affecting communications, logging, and other features. Where appropriate values will differ by setup, the file leaves settings blank. This means that you cannot start DKUS 30 until you have edited the configuration file, providing values for those settings.

A unit-specific recovery key is pre-placed in each meter 20 at the time of its manufacture. To provide DKUS 30 with these keys, the system needs to import the information from a file provided by the meter manufacturer 20. Importing populates the recovery key field of every meter 20 in the database. The recovery key's meter state is set to "consistent." Other key fields remain uninitialized; they will be populated when the meter 20 authenticates itself to the CE 26.

The DKUS 30 daemon listens for commands from the CE 26 and executes them. The port the daemon listens on is specified in the configuration file, as are other options. The daemon starts automatically when the system is booted. The system can check the daemon's status by issuing a suitable status command. Manual start and stop commands should also be provided. If settings are changed in the configuration file, the daemon will need to be re-started for the settings to take effect.

Daemon functionality is initiated by the CE 26 and completed automatically by the Daemon; no operator involvement is needed. The following are high-level overviews of process flow for each type of functionality provided by the daemon.

Figure 11:
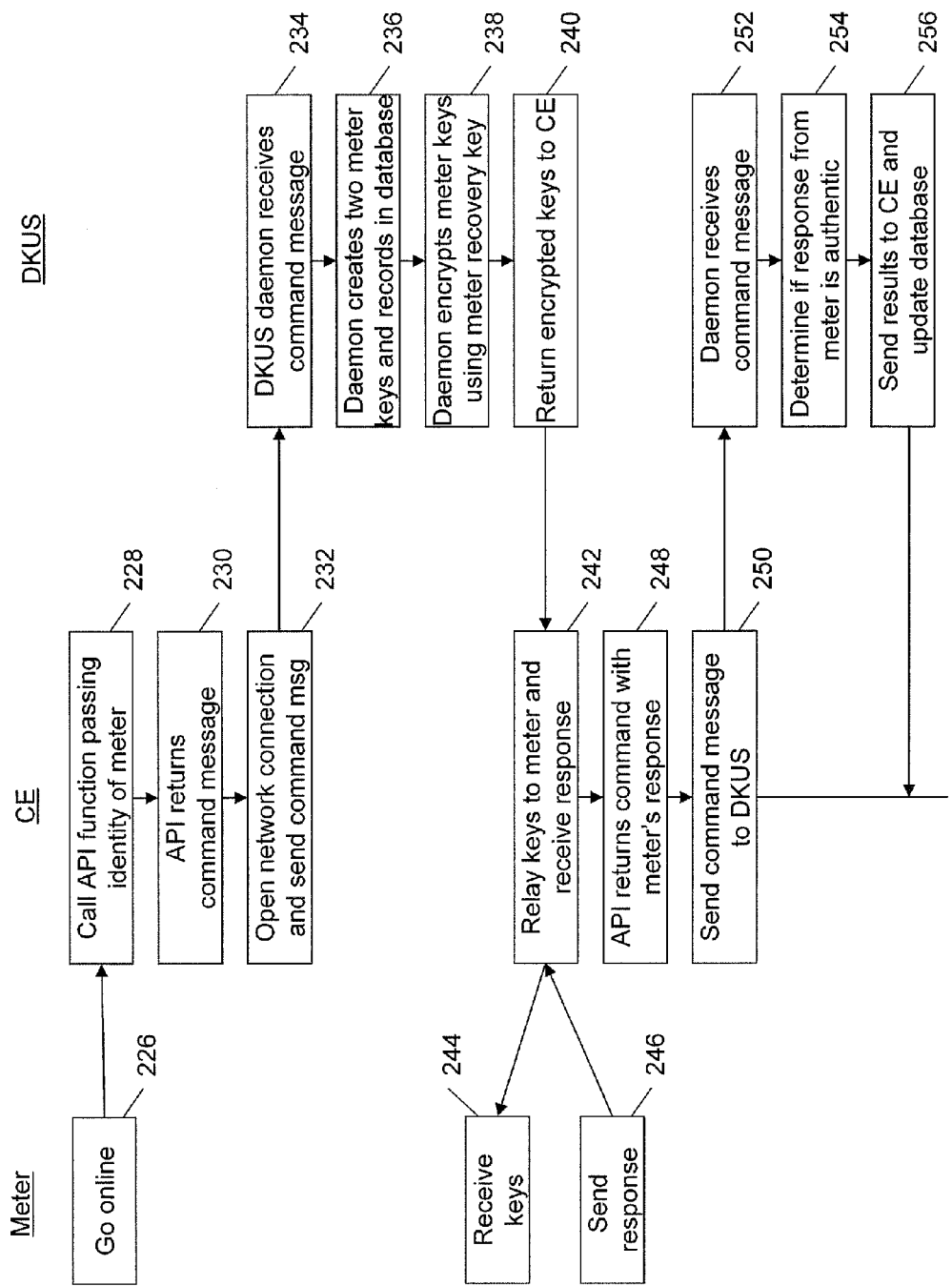
FIG. 11 is a flow diagram illustrating an example process for generating new meter keys.

The following process, shown in FIG. 11, may be used to authenticate a new meter 20 when it comes online at 226: 1. The CE 26 calls the client API's AuthChallengeGenerate( ) function, passing it the identity of the meter 20 at 228; 2. The API returns a command message at 230; 3. The CE 26 opens a network connection and sends the command message to DKUS 30 at 232; 4. The DKUSD 64 receives the command message at 234; 5. The DKUSD 64 creates two meter keys for the meter 20 and records them in the database 66 at 236, setting the meter state to "authenticating"; 6. Using the meter's recovery key, the DKUSD 64 encrypts the meter keys at 238; 7. The daemon 64 returns the encrypted keys to the CE 26 over the network connection (at this point, the CE 26 uses functionality provided by the SES 28 to send the keys to the meter 20 at 240; 8. After the keys have been relayed to the meter 20 at 242 by sending them to the meter 20 at 244, the CE 26 receives a response from the meter 20 at 246; 9. The API returns a command message, which includes the meter's response at 248; 10. The CE 26 sends the command message to DKUS 30 at 250; 11. The DKUSD 64 receives the command message at 252; 12. The DKUSD 64 determines if the response received from the meter 20 indicates that the meter 20 is authentic and received the meter keys correctly at 254; and 13. The DKUSD 64 sends the results to the CE 26 over the network connection at 256 and updates its own database, setting the meter state to "consistent," if the meter's response indicated success, or "failed," if an acceptable response was not received from the meter 20.

Figure 12:
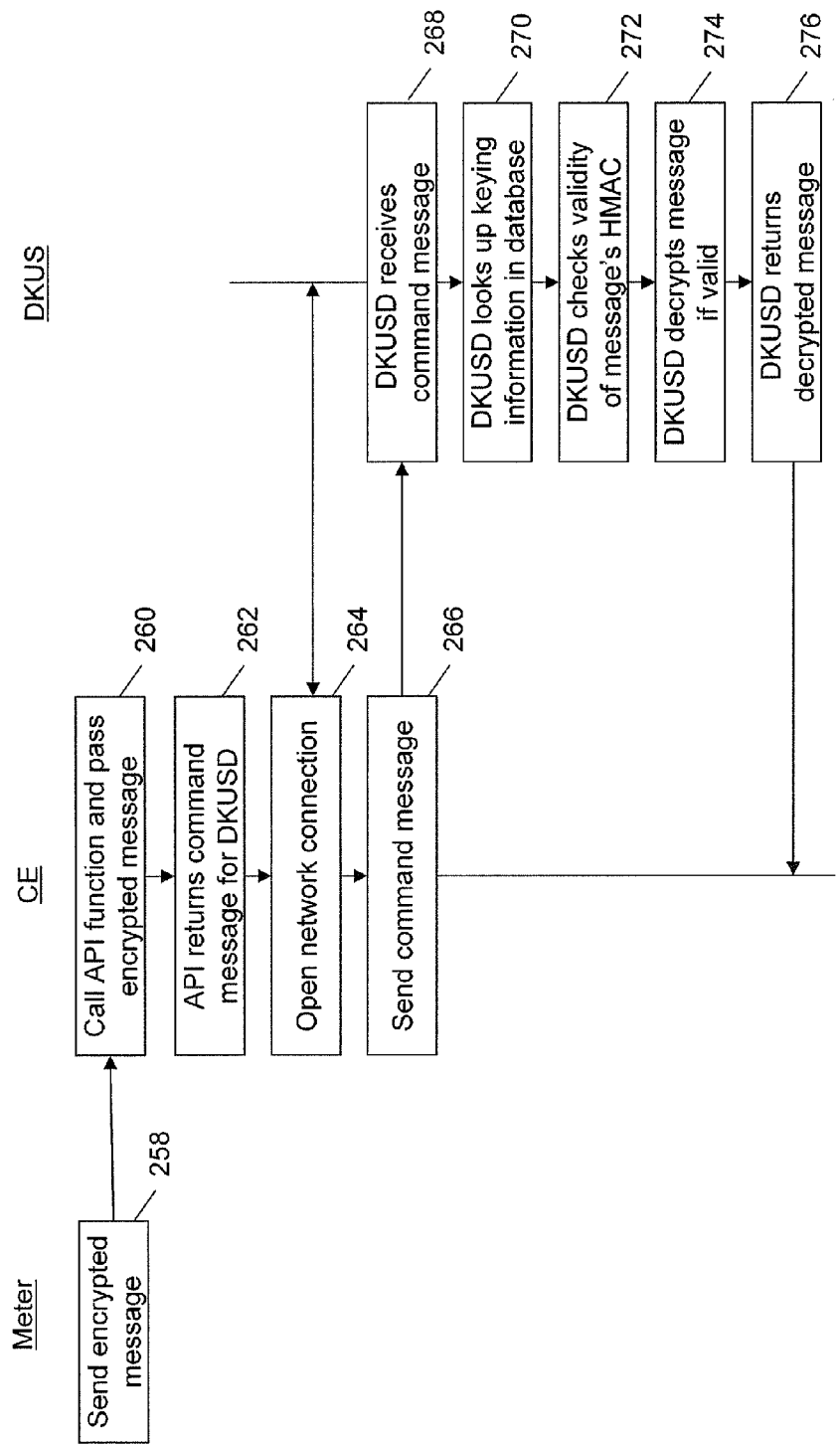
FIG. 12 is a flow diagram illustrating an example process for decrypting a message sent to the CE by a meter.

The following process, shown in FIG. 12, may be used to validate and decrypt a message received by the CE 26 from a meter 20 at 258: 1. The CE 26 calls the client API's DecryptandValidateMessage( ) function, passing it the encrypted message and information about the sending meter 20 at 260; 2. The API returns a command message for the DKUSD 64 at 262, which includes within it the encrypted message and identity of the sending meter 20; 3. The CE 26 opens a network connection at 264 and sends the command message to DKUS 30 at 266; 4. The DKUSD 64 receives the command message at 268; 5. The DKUSD 64 looks up keying information for the sending meter 20 in the database 66 at 270; 6. The daemon 64 checks the validity of the message's HMAC (Hash Method Authentication Code) at 272. If the HMAC check fails, the daemon 64 returns an "HMAC Invalid" error to the CE 26; 7. The daemon 64 decrypts the message at 274; and 8. The daemon 64 returns the decrypted message to the CE 26 at 276.

Figure 13:
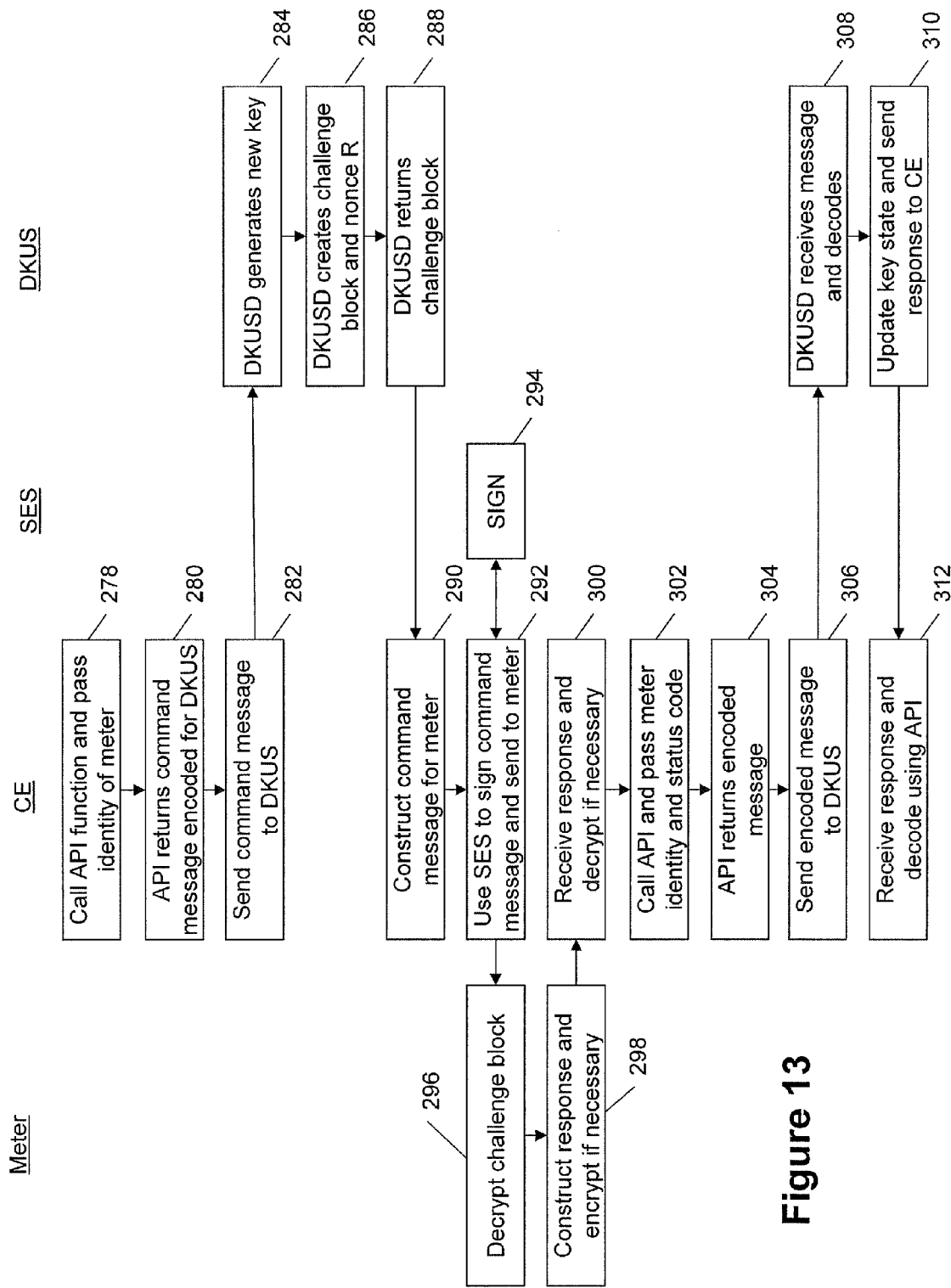
FIG. 13 is a flow diagram illustrating an example process for updating a meter key.

The following process, shown in FIG. 13, may be used to update a meter key at the request of the CE 26: 1. The CE 26 calls the client API's UpdateMeterKeyEncode( ) function, passing it the identity of the meter 20, the slot to be rolled over and a job identifier at 278; 2. The API returns a command message encoded for delivery to DKUS 30 at 280; 3. The CE 26 sends the command message to DKUS 30 at 282; 4. The DKUSD 64 generates a new key for the meter 20 in the slot specified (if the slot specified is a system key slot, then generation is skipped) at 284; 5. Using the meter's recovery key (public part), the DKUSD 64 creates a challenge block at 286 containing the newly generated meter specific key, and a random challenge nonce—R (it sets the key state of slot for the meter 20 to "authenticating" mode); 6. The daemon 64 returns challenge block to the CE 26 over the network connection at 288; 7. The CE 26 constructs a command message for the meter 20 to take up the challenge block at 290; 8. The CE 26 uses functionality provided by the SES 28 to sign the command message and send the challenge block to the meter 20 at 292 and 294; 9. The meter 20 decrypts the challenge block at 296 using the private part of the recovery key (programmed in it during manufacturing)—It updates its key store and stores the random challenge nonce R; 10. The meter 20 constructs a response and encrypts it as necessary at 298, attaching an HMAC to the message; 11. The CE 26 receives the response meter 20 at 300 and uses the Decrypt and Validate process to decrypt it; 12. The CE 26 calls the client API's KeyUpdateNotificationEncode( ) passing it the meter 20 identity at 302, and the status code indicating successful update—timestamp is set to NULL; 13. The API returns an encoded message back to the CE 26 at 304; 14. The CE 26 sends the encoded message to DKUS 30 at 306; 15. The DKUSD 64 receives the message and decodes it at 308; 16. If status code specified is zero, DKUS 30 moves the key state to "consistent"—If status code is non-zero, DKUS 30 sets the key state to "failed"—In either case, it packages a success response and sends to CE 26 at 310; and 17. The CE 26 receives the message and calls client API's KeyUpdateNotificationDecode( ) to decode the response from the DKUS 30 at 312.

Figure 14:
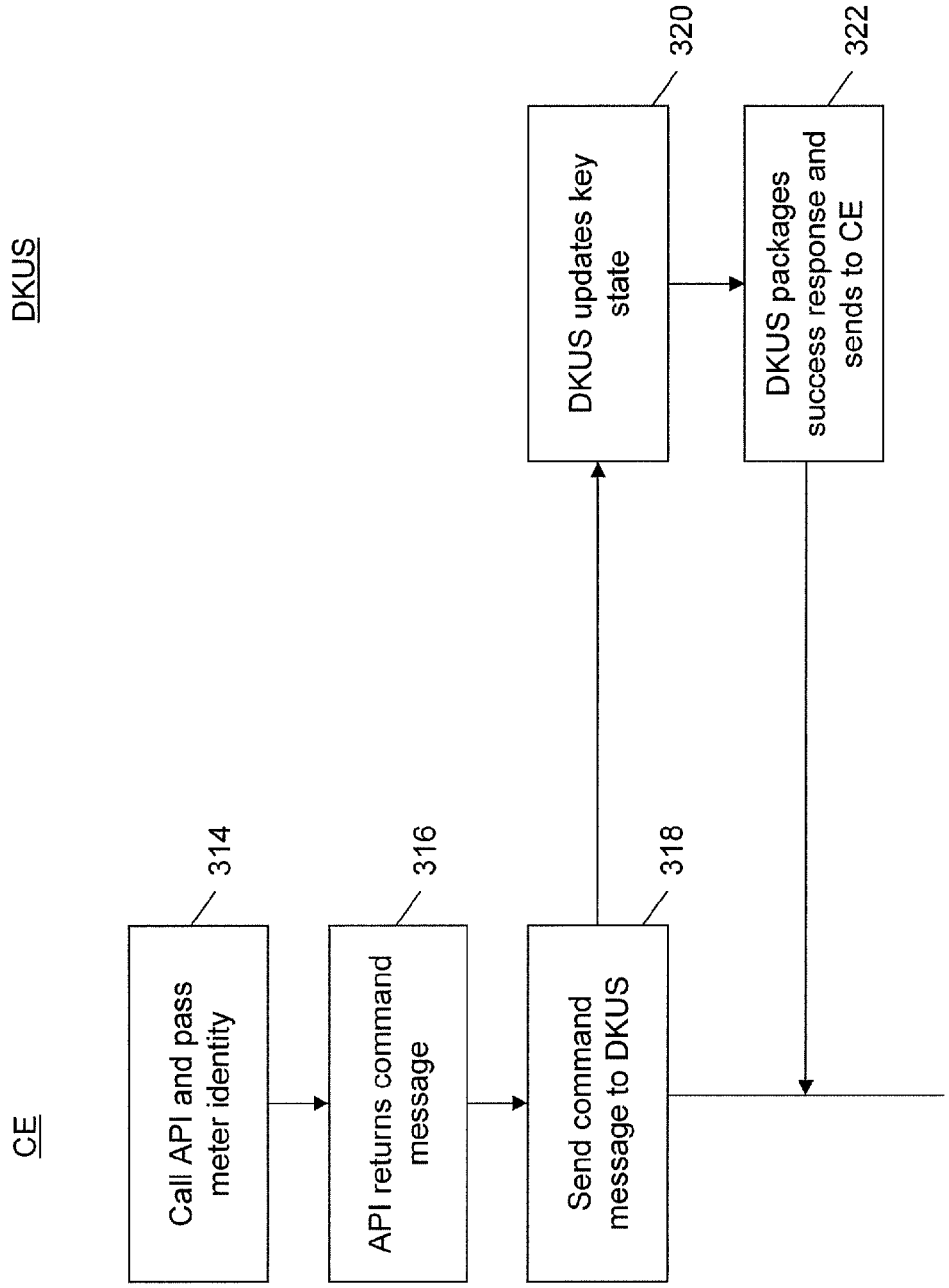
FIG. 14 is a flow diagram illustrating an example process for updating a key state.

The following process, shown in FIG. 14, may be used to record the result of a key update command sent to a meter 20: 1. The CE 26 calls the client API's KeyUpdateNofitication-Encode( ) function, passing it the identity of the meter 20 at 314; 2. The API returns a command message encoded for delivery to DKUS 30 at 316; 3. The CE 26 sends the command message to DKUS 30 at 318; and 4. If status code specified is zero, DKUS 30 moves the key state to "consistent" at 320. If the status code is non-zero, DKUS 30 sets the key state to "failed" at 320. In either case, it may package a success response and send to CE 26 at 322.

DKUS 30 provides command-line tools to allow operators to initiate key administration tasks procedures on meters. Of the two, MMK 70 is geared for meter-specific management operations. MSK 68 allows performance of system-wide key changes. Both commands are tools giving control over the whole system 10.

The MMK 70 manages the meter keys assigned to a meter 20 or group of meters 20. Keys can be rolled over, updated or replaced. Rollover and update operations should only be performed on the standby key. The ESN of the meter 20 or meters 20 on which the operation is to be performed would need to be indicated. For operations on multiple meters 20, ESNs should be provided in a file via STDIN, with one ESN per line. Each line, including the last, needs to be terminated with a newline character.

The MSK 68 permits the updating of system-wide keys, the importation and exportation of meter key sets, and the checking of key states. Update operations may only be performed on standby keys.

As shown in FIG. 3, DKUS 30 is designed to allow for the provision of a secondary DKUS 30 unit as a backup for use in the event of catastrophic failure. When activated, the secondary DKUS 30 unit takes over DKUS 30 functionality.

To activate the secondary DKUS 30 unit, the following steps may be completed: 1. On the backup DKUS 30 server, run a failover script; 2. Update configuration files for SES 28 servers and the CE 26 to use the IP address of the backup server to contact DKUS 30; and 3. Restart SES 28 software so that the configuration file settings change takes effect.

DKUS Upgrades and Updates

The following provides information on installing updates to the DKUS 30 system. Three possible types of updates are anticipated: software-only, software and configuration file syntax, software and database schema. In all cases, the trusted entity should supply release notes with details of the update procedure required.

Software-only—To perform a software-only upgrade, the following steps on both the main and backup DKUS 30 units may be completed: 1. Make backups of DKUS 30 files; 2. Execute the install DKUS 30 script contained in the update package; and 3. After installation is complete, start DKUS 30.

To perform a software and configuration file upgrade, the following steps may be completed on both the main and backup DKUS 30 units: 1. Make backups of the DKUS 30 files; 2. Execute the install DKUS 30 script contained in the update package; 3. Merge active configuration file with sample file contained in update package; and 4. After installation is complete, start DKUS 30.

To perform a software and database schema upgrade, the following steps may be completed: 1. Stop synchronization of main database with backup DKUS 30 database; 2. Stop both main and backup DKUS 30 units; 3. Make backups of DKUS 30 files; 4. Execute the install DKUS 30 script contained in the update package; 5. Confirm that master and slave databases are in sync; 6. Convert the database to the new format using a tool provided in the update package—the tool and instructions for using should be specific to the update; 7. Verify that database has been converted successfully; 8. Re-enable database synchronization; and 9. Re-start both main and backup DKUS 30 units.

Key Generator Server

The Key Generator (KG) is responsible for the generation of ECC key pairs which will be installed in meters 20 on the manufacturing/testing line. As a result of this, the KG and its components do not need to or should interact with other components in the system. The KG infrastructure comprises the following components: Key Generator Server Daemon (KGSD) 72; and Key Generator Client Library (KGCL) 74.

The KGCL 74 is an API packaged in the form of a Windows DLL which is used to communicate with the KGSD 72. The agent DLL is linked with the meter manufacturing software used to program/manufacture the meters 20. The KGCL 74 connects to the KGSD 72 over an SSL secured TCP connection and provides a simple API to connect to the KGSD 72, to fetch asymmetric key pairs and to return key usage log files to the KGSD 72.

The client library establishes an SSL connection which supports the following features: Client authentication, no session resumption, TLS_ECDHE_ECDSA_WITH_AES_128_CBC_SHA, TLSv1 protocol, and sect256r1 curve support. It may be note all cryptographic operations on the client side should be performed in software and in most applications there is no requirement for an HSM on the client.

The client library 74 maintains a global context which will be an opaque structure known as kg_ClientCtx. This context contains all global communication information needed for a secure connection to the KGS 36. The client connection context may be an opaque structure known as kg_ClientConnectionCtx. The client maintains one per KGS 36 connection.

HSM card may be used for random data when generating keys. (Key generation will occur in software).

The configuration file specifies the parameters used to initialize the KGSD 72 and the file format can be INI based.

The key generation log created by the KGSD 72 will contain the following information: timestamp of key pair generation, key pair ID, client IP address. The key usage log is returned by the KGCL 74. It should contain the following information: timestamp of key pair usage, key pair ID, meter ID, client IP address, status code.

As noted above, generation of ECC key pairs for meters 20 involves a simple client-server architecture, where the KGCL 74, residing at some node on the meter 20 manufacturing/testing line (or multiple nodes, if need be), is used to request key pairs from the KGS 36 over a network connection. All communications may be secured using SSL, and all transactions logged on the KGS 36, e.g., in XML format. The KGS 36 utilizes an HSM for true random number generation for key pairs. The general data flow is as follows (note that simultaneous connections are allowed): the KGCL 74 creates an SSL socket connection with the KGSD 72; the KGSD 72 waits for message on socket; the KGSD 72 receives message and decodes it; the KGSD 72 finds key pair generation request and generates a key pair; the KGSD 72 encodes key pair and returns to KGCL 74; the KGSD 72 logs key generation event to disk; the KGSD 72 waits for another message; the KGCL 74 decodes key pair and provides to caller; the KGCL 74 receives key usage log details from caller; the KGCL 74 encodes log message and sends to KGSD 72; the KGSD 72 decodes log message and stores to disk; the steps following the establishment of the secure connection may be repeated for additional requests if necessary; and the KGCL 74 closes connection to KGSD 72. It may be noted that it need not be the responsibility of the KGS 36 or KGCL 74 to deliver the public key for each meter 20 key pair generation to the back-end systems, other methods to extract various data from the meter 20 can be used.

The KGCL 74 in this example provides a simple API to fetch asymmetric key pairs from the KGS 36. There are 4 specific functions that the KGCL 74 provides: connect to the KGS 36, get one or more key pairs, return one or more key usage logs, and disconnect from the KGS 36. The key pairs are provided as raw byte data from the interface. The log data that is returned is a mix of string and integer data.

The KGSD 72 is in this example a Linux daemon which handles key pair generation requests by listening for incoming SSL connections from the KGCL 74. Before listening for messages, the KGSD 72 reads a configuration file which contains information required to operate, such as network configuration for communication from the client. After accepting an SSL connection from a requester using the KGCL 74, the KGSD 72 listens for messages on that socket (and any other connected sockets). The message could be either a key pair generation request, or a key usage log message—note that this should only occur if a previous key pair request session has been disconnected, either deliberately, or accidentally. The KGSD 72 as described herein is stateless in the sense that it does not need to maintain persistent data if a session is terminated.

For key pair generation, the KGSD 72 fetches random data from the HSM hardware RNG to ensure that the generated keys have sufficient entropy. After generation, the key pair is encapsulated and sent back to the client. A log is then created on the KGS 36 to record the event. The KGSD 72 then waits for another message, which could be either another key generation request, or a key usage log return. When a log is received, it is decoded and stored on the KGS 36 disk. Each key generation log may contain the following data: timestamp of key pair generation, public Key fingerprint, and a request for the client IP address. Each key usage log may contain the following data: timestamp of key pair usage, public Key fingerprint, meter ID, a request for a client IP address, and a status code.

Keys and Key Management

The DKUS 30 is responsible for managing the states of the systems keys and, as defined above, in the present example, there are six types of keys, listed below in Table 2:

TABLE 2

Key Types

| Key Type | Cryptography | Quantity Per Meter | Shared/Unique |
|---|---|---|---|
| Command | ECC-283 | 4 | Shared |
| Revocation | ECC-283 | 2 | Shared |
| Recovery | ECC-283 | 1 | Unique |
| Handheld | ECC-283 | 2 | Shared |
| Meter | AES-128 | 2 | Unique |
| System | AES-128 | 2 | Shared |

To manage keys within the system as a whole, the operator will need to know whether the key held in the DKUS 30 and the key held in the meter 20 match. Moreover, because commands are often issued on a multi-cast basis, the operator will need to know whether any shared keys they wish to use are in agreement across the larger population of meters 20. This requires the DKUS 30 to track a state for each key.

Key state management is performed at two levels: the system level and the device level. At the system level, the DKUS 30 maintains the following data:

Key slot—which position in the C12.19 key table corresponds to this key.

Key label—which named key in the HSM corresponds to this key. The key label is typically only meaningful for asymmetric keys managed within the SES 28. The key label may also be "none" when there is no corresponding key in the HSM, or "na" when the key will not be provided in the HSM. It may be noted that "none" and "na" cannot be used as conventional key labels.

Key type—command, revocation, meter 20, or system. It may be noted that in this example there is a single recovery key per meter 20 that functions as seed material for key distribution. As such, no state tracking is required for the recovery key.

Key state—active or standby.

The system level meta-data is used to control how the SES 28 responds to requests, as well as on which keys DKUS 30 management operations may be performed. Default entries can be provided for all ten system keys. The following Table 3 is an example default key management table:

TABLE 3

Default Key Management Table

| Slot | Label | Type | State |
|---|---|---|---|
| 1 | None | Command | Empty |
| 2 | None | Command | Empty |
| 3 | None | Command | Empty |
| 4 | None | Command | Empty |
| 5 | None | Revocation | Empty |
| 6 | None | Revocation | Empty |
| 7 | NA | System | Empty |
| 8 | NA | System | Empty |
| 9 | NA | Meter | Standby |
| 10 | NA | Meter | Standby |
| 11 | NA | Recovery | Empty |
| 12 | NA | Random Seed/ Challenge Nonce | Empty |

There are three states at the system level empty 324, active 328, and standby 326. Transition between them is controlled by the operator through the DKUS 30 user interface. As shown in FIG. 15, for asymmetric keys, until a HSM key label is assigned to a slot, the state is set to empty 324. The symmetric system keys are defaulted to empty 324 until a symmetric key is generated locally at the DKUS 30, and then transferred over to the SES 28. Once a relationship is established between an asymmetric key and the key label, or once a symmetric key is generated, the key state changes to standby 326. An operator typically uses the DKUS 30 user interface to manually select which keys are set active 328. If no key is currently set active 328, the SES 28 may return an error when asked to sign a message. For proper operations, only one key of each type should be set active and the system should allow only one key of a given type to be active at a given time.

To successfully update keys in devices, the DKUS 30 should also be able to track key states at the device level. Standard key updates are inherently a multi-step process. Turning now to FIG. 16, the operator initiates a key update resulting in keys being rolled-over or updated at individual devices. The collection engine responds back indicating success or failure in updating a given device. The state of the keys at each individual device should then be known so that the aggregate state of the key across the system can be determined. The DKUS 30 tracks the state of each key type at each individual meter 20. The meta-data for an individual meter 20 includes: Meter's ESN, Meter's Recovery Key, Command Key 1 State, Command Key 2 State, Command Key 3 State, Command Key 4 State, Revocation Key 1 State, Revocation Key 2 State, Public Key Hash, System Key 1 State, System Key 2 State, Meter Key 1 State, Meter Key 1 ($S_M^8$), Meter Key 2 State, Meter Key 2 ($S_M^9$), and Meter Seed ($S$).

Initially, there is no data about the devices in the system. The operator imports a file providing the ESN and recovery key for each device, as well as the public signing keys loaded into the device at the factory. This process creates an entry for each ESN in the file and sets the shared key states to "uninitialized" at 330. Assuming that the public key listed in the file matches the corresponding public key in the DKUS 30, the public key state is set to "consistent" 336. If a given public key does not match, the public key state is set to "inconsistent" 338. The file format may be any suitable format such as XML.

In order to ensure the integrity of the data submitted to the utility, the file should be signed with a signing key. The file's signature will be validated using a public key prior to importing the key material. The public key will be preloaded at the factory in each DKUS 30 and cannot be changed by the operator. It may be noted that a valid signature alone should not be sufficient to load the key material. The operator should have the appropriate access and authorization to the DKUS 30 to perform a meter key import.

With the exception of new old stock, it is expected that upon loading the ESN file, a typical meter record will be populated as shown in Table 4 below:

TABLE 4

Sample Meter Record

| Field Name | Value |
| --- | --- |
| ESN | Meter's ESN |
| Recovery Key | Meter's Recovery Key |
| Command Key 1 State | CONSISTENT |
| Command Key 2 State | CONSISTENT |
| Command Key 3 State | CONSISTENT |
| Command Key 4 State | CONSISTENT |
| Revocation Key 1 State | CONSISTENT |
| Revocation Key 2 State | CONSISTENT |
| System Key 1 State | UNINITIALIZED |
| System Key 2 State | UNINITIALIZED |
| Meter Key 1 State | UNINITIALIZED |
| Meter Key 1 ($S_M^8$) | NULL |
| Meter Key 2 State | UNINITIALIZED |
| Meter Key 2 ($S_M^9$) | NULL |
| Meter Seed ($\overline{S}$) | NULL |

At this point, the meter 20 can be put through the authentication process at 332 when a registration request is received from a device in the field. When such a request is received, the DKUS 30 generates and stores a new meter seed $\overline{S}$, and new meter keys, $S_M^8$ and $S_M^9$, which are then used to authenticate the device. Once the authentication challenge generation has been requested of the DKUS 30 by the CE 26, the meter key state for System Key 1, System Key 2, Meter Key 1, and Meter Key 2, are all set to "authenticating".

From the authenticating state 332, the meter 20 can move into "failed" 334 or "consistent" 336. If the CE 26 receives a response back, it is provided back to the DKUS 30. If the response matches what is expected, the DKUS 30 sets the key states on all keys involved in the authentication process (System Key 1, System Key 2, Meter Key 1, and Meter Key 2) to "consistent" 336.

The revocation key is, in this example, the only key that can be used to update the public keys of the meter 20. In the life of the system (e.g. 20 years) it can be likely that some new old stock will need to be deployed. Simultaneously, it is likely that signing keys will change over the years. As a result it is necessary to be able to perform a key update on the command keys and the revocation key prior to completing device authentication. The expected use case is: old stock meter 20 is installed, device syncs to network and registers, CE 26 attempts to authenticate meter 20, authentication fails because meter 20 does not have correct signing key, security operator logs into DKUS 30 and requests key update of command key referencing ESN and historical revocation key label, DKUS 30 initiates key update, once the revocation is updated to a current key, the other signing keys can be updated, and the meter 20 is resubmitted for authentication.

To promote the separation of concerns between the CE 26 and the cryptographic backend 24, security operations, such as key roll-overs, are controlled through the DKUS 30. The DKUS 30 may thus provide a command line driven interface and operations involving meters 20 may be made to require that the DKUS 30 call functions provided by the CE 26.

The following discusses key generation, wherein an example use case is as follows: operator needs new key pair for signing; operator logs into cryptographic backend 24; operator issues command to generate new key pair; security officers present their smart cards to restore backup key; SES 28 generates key pair, encrypts it with Backup key and backs it up to file; operator issues command to imports key pair from file; security officers present their smart cards to restore Backup key; SES 28 imports key pair, decrypting it using Backup key; operator exports public key for manufacturing— or—operator pushes public key to meters 20; and operator assigns private key to slot.

An example use case for performing a key transfer is as follows: operator needs to bring a new SES 28 online; operator logs into SES 28; operator copies key files created during key generation to SES 28; operator issues command to imports key pair from file; security officers present their smart cards to restore Backup key; and SES 28 imports key pair, decrypting it using Backup key.

An example use case for performing a key backup is as follows: operator needs to backup keys; key backups are created at time of key generation; and operator backs up files.

For the key generation, key transfer, and key backup to occur, the security server should have been initialized. Also, operator should have appropriate administrator access, including necessary administer password. A second security administrator with password should also be present, if server is configured to require two administrators. The Backup key should have already been generated and split across security officers' smart cards, and in this example, three of seven security officers should be present with smart cards and passwords.

Key removal allows utilities to remove the recovery key from the HSM and hold it in reserve in case the HSM were to be compromised, or taken by collusion or force. If a key is fact removed from the HSM it may result in a scenario in which the DKUS 30 has a reference to a given key label, but the key is not actually available. The system could address this one of two ways. One example would be to track some sort of SES 28 key state at the DKUS 30, and have internal notifications when a key is removed. Another approach is to simply log an appropriate error when the system tries to use a labelled key that is not currently present.

An example use case for performing key removal is as follows: operator has loaded key into SES 28 for command key update operation; command key update completes; operator logs into SES 28; operator issues command to delete signing key; and SES 28 deletes signing key.

The MMK 70 allows the operator to perform meter specific key updates on an individual meter 20, or a list of meters 20. MMKs 70 can be used to rollover, replace, or delete meter key entries by logging into the DKUS 30, issuing a particular command and then the DKUS 30 executes the command.

The MSK 68 allows the operator to perform key updates on system wide keys, import meter key sets, export public key sets, and check key states. An example use case for setting an active key is as follows: Operator needs to change which system-wide key is currently in use; Operator logs into the DKUS 30; Operator issues command to set a different key active; the DKUS 30 verifies that no keys of the specified type are currently "empty"; the DKUS 30 determines the consistency of the proposed key; the DKUS 30 presents consistency; the DKUS 30 issues warning if consistency is below, e.g. 98%; the DKUS 30 issues error if consistency is below, e.g. 95%; the DKUS 30 prompts operator to confirm operation; Operator confirms operation; and the DKUS 30 sets proposed key to active, sets all other keys of the same type to standby.

An example use case for an install command or revocation key is as follows: Operator needs to install a command or revocation key; Operator generates new key in SES 28; Operator logs into DKUS 30; Operator issues command to install a system-wide key, including the key label; and DKUS 30 validates that targeted key state is currently "empty".

An example use case for an update command or revocation key is as follows: Operator needs to update a command or revocation key; Operator logs into the DKUS 30; Operator issues command to update system-wide key, including the label of a key already generated and loaded into the SES 28; the DKUS 30 validates that targeted key is not currently active; and the DKUS 30 initiates the key update process.

An example use case for generating a shared symmetric system key is as follows: Operator needs to install or update a shared symmetric system key; Operator logs into the DKUS 30; Operator issues command to generate a shared symmetric system key; the DKUS 30 validates that targeted key state is currently "empty" or "standby"; the DKUS 30 generates and records new random key; the DKUS 30 transfers new random key to SES 28; if current state is "empty" DKUS 30 changes key state to standby; and if current state is "standby", DKUS 30 issues key update command to CE 26 to propagate new key to meters 20.

An example use case for rolling over a shared symmetric system key is as follows: Operator needs roll over a shared symmetric system key; Operator logs into the DKUS 30; Operator issues command to roll-over a shared symmetric system key; the DKUS 30 validates that targeted key state is currently "standby"; the DKUS 30 rolls over system shared key; the DKUS 30 transfers new shared key to SES 28; and the DKUS 30 issues key roll-over command to CE 26 to roll-over meters 20.

An example use case for showing a key status is as follows: Operator needs to determine current state of system wide keys; Operator logs into the DKUS 30; Operator issues command to show system wide key status; the DKUS 30 examines key states for every device, and determines a consistency level for each system key slot; and the DKUS 30 reports the aggregate key state to the operator.

An example use case for showing key details is as follows: Operator needs to troubleshoot the consistency of a given system wide key; Operator logs into the DKUS 30; Operator issues command to show details for a particular system wide key; and the DKUS 30 examines key states of every device, reporting the state on a device by device basis, filtered by state if specified, for the key slot specified, and reports them to the operator.

Accordingly, there may be provided a method for securely communicating with electronic meters, the electronic meters being communicatively connectable to an intermediary server controlled by a utility, the utility providing a service associated with the electronic meters, the method comprising: a cryptographic backend system comprising one or more cryptographic servers receiving a first request from the intermediary server to cryptographically process a first message to be sent to an electronic meter; the cryptographic backend system cryptographically processing the first message to generate a first protected message according to requirements associated with the first message and using one or more cryptographic keys associated with the electronic meter; the cryptographic backend system returning the first protected message to the intermediary server for providing the protected message to the electronic meter; the cryptographic backend system receiving a second protected message from the intermediary server, the second protected message having been generated by the electronic meter cryptographically processing a second message, and having been sent by the electronic meter to the intermediary server; the cryptographic backend system determining one or more keys associated with the electronic meter; the cryptographic backend system cryptographically processing the second protected message to obtain the second message; and the cryptographic backend system returning the second message to the intermediary server to enable the intermediary server to interpret the second message.

There may also be provided a computer readable medium comprising computer executable instructions for securely communicating with electronic meters, the electronic meters being communicatively connectable to an intermediary server controlled by a utility, the utility providing a service associated with the electronic meters, the computer readable medium comprising instructions for: receiving a first request from the intermediary server to cryptographically process a first message to be sent to an electronic meter; cryptographically processing the first message to generate a first protected message according to requirements associated with the first message and using one or more cryptographic keys associated with the electronic meter; returning the first protected message to the intermediary server for providing the protected message to the electronic meter; receiving a second protected message from the intermediary server, the second protected message having been generated by the electronic meter cryptographically processing a second message, and having been sent by the electronic meter to the intermediary server; determining one or more keys associated with the electronic meter; cryptographically processing the second protected message to obtain the second message; and returning the second message to the intermediary server to enable the intermediary server to interpret the second message.

There may also be provided a cryptographic backend system for enabling an intermediary server to securely communicate with electronic meters, the electronic meters being communicatively connectable to the intermediary server, the intermediary server being controlled by a utility, the utility providing a service associated with the electronic meters, the cryptographic backend system comprising: one or more cryptographic servers configured for: receiving a first request from the intermediary server to cryptographically process a first message to be sent to an electronic meter; cryptographically processing the first message to generate a first protected message according to requirements associated with the first message and using one or more cryptographic keys associated with the electronic meter; returning the first protected message to the intermediary server for providing the protected message to the electronic meter; receiving a second protected message from the intermediary server, the second protected message having been generated by the electronic meter cryptographically processing a second message, and having been sent by the electronic meter to the intermediary server; determining one or more keys associated with the electronic meter; cryptographically processing the second protected message to obtain the second message; and returning the second message to the intermediary server to enable the intermediary server to interpret the second message.

Although the above principles have been described with reference to certain specific embodiments, various modifications thereof will be apparent to those skilled in the art without departing from the scope of the claims appended hereto.

The invention claimed is:

1. A method for securely communicating with electronic meters, said electronic meters being communicatively connectable to an intermediary server controlled by a utility, said utility providing a service associated with said electronic meters, said method comprising:
   a cryptographic backend system comprising one or more cryptographic servers provisioning an electronic meter with at least one cryptographic key to enable said electronic meter to cryptographically process messages sent thereto by said utility, said messages being cryptographically processed by said cryptographic backend system on behalf of said utility;
   the cryptographic backend system receiving a first request from said intermediary server to cryptographically process a first message to be sent to an electronic meter;
   said cryptographic backend system cryptographically processing said first message to generate a first protected message according to requirements associated with said first message and using one or more cryptographic keys corresponding to said at least one cryptographic key provisioned for said electronic meter;
   said cryptographic backend system returning said first protected message to said intermediary server for providing said protected message to said electronic meter;
   said cryptographic backend system receiving a second protected message from said intermediary server, said second protected message having been generated by said electronic meter cryptographically processing a second message using said at least one cryptographic key, and having been sent by said electronic meter to said intermediary server;
   said cryptographic backend system determining one or more cryptographic keys corresponding to said at least one cryptographic key provisioned for said electronic meter;
   said cryptographic backend system cryptographically processing said second protected message to obtain said second message; and
   said cryptographic backend system returning said second message to said intermediary server to enable said intermediary server to interpret said second message from said electronic meter.

2. The method according to claim 1, wherein said first message has been encoded in a first request sent by said intermediary server, said method further comprising said cryptographic backend system decoding said request to obtain said first message upon receipt thereof, and encoding said first protected message in a first response prior to returning said first protected message to said intermediary server.

3. The method according to claim 1, wherein said second protected message has been encoded in a second request sent by said intermediary server, said method further comprising said cryptographic backend system decoding said second request to obtain said second protected message upon receipt thereof, and encoding said second message in a second response prior to returning said second message to said intermediary server.

4. The method according to claim 1, wherein said cryptographic backend system comprises a first cryptographic server for processing messages to be sent to said electronic meters, and a second cryptographic server for processing messages received by said intermediary server from said electronic meters.

5. The method according to claim 4, wherein said first cryptographic server is configured to perform encryption and signing operations, and wherein said second cryptographic server is configured to perform decryption operations.

6. The method according to claim 4, wherein said second cryptographic server is configured to store and manage keys associated with said electronic meters, and wherein said first and second cryptographic servers are communicably connectable to each other to enable said first cryptographic server to determine from said second cryptographic server, whether or not said first message should be encrypted before it is signed.

7. The method according to claim 4, wherein said first cryptographic server comprises a daemon for handling service requests pertaining to said first message received from said intermediary server and said second protected message being sent to said intermediary server.

8. The method according to claim 1, wherein said first message is signed, and wherein said second protected message is encrypted and is thereby decrypted by said cryptographic backend system.

9. The method according to claim 8, wherein said first message is encrypted prior to being signed.

10. A non-transitory computer readable medium comprising computer executable instructions for securely communicating with electronic meters, said electronic meters being communicatively connectable to an intermediary server controlled by a utility, said utility providing a service associated with said electronic meters, said computer readable medium comprising instructions for:
   provisioning an electronic meter with at least one cryptographic key to enable said electronic meter to cryptographically process messages sent thereto by said utility, said messages being cryptographically processed by a cryptographic backend system on behalf of said utility;
   receiving a first request from said intermediary server to cryptographically process a first message to be sent to an electronic meter;
   cryptographically processing said first message to generate a first protected message according to requirements associated with said first message and using one or more cryptographic keys corresponding to said at least one cryptographic key provisioned for said electronic meter;
   returning said first protected message to said intermediary server for providing said protected message to said electronic meter;
   receiving a second protected message from said intermediary server, said second protected message having been generated by said electronic meter cryptographically processing a second message using said at least one cryptographic key, and having been sent by said electronic meter to said intermediary server;
   determining one or more cryptographic keys corresponding to said at least one cryptographic key provisioned for said electronic meter;
   cryptographically processing said second protected message to obtain said second message; and
   returning said second message to said intermediary server to enable said intermediary server to interpret said second message from said electronic meter.

11. The non-transitory computer readable medium according to claim 10, wherein said first message has been encoded in a first request sent by said intermediary server, said method further comprising said cryptographic backend system decoding said request to obtain said first message upon receipt thereof, and encoding said first protected message in a first response prior to returning said first protected message to said intermediary server.

12. The non-transitory computer readable medium according to claim 10, wherein said second protected message has been encoded in a second request sent by said intermediary server, said method further comprising decoding said second request to obtain said second protected message upon receipt thereof, and encoding said second message in a second response prior to returning said second message to said intermediary server.

13. The non-transitory computer readable medium according to claim 10, wherein said instructions are executed by a first cryptographic server for processing messages to be sent to said electronic meters, and a second cryptographic server for processing messages received by said intermediary server from said electronic meters.

14. The non-transitory computer readable medium according to claim 13, wherein said instructions configure first cryptographic server to perform encryption and signing operations, and wherein said instructions configure said second cryptographic server to perform decryption operations.

15. The non-transitory computer readable medium according to claim 13, wherein said instructions configure said second cryptographic server to store and manage keys associated with said electronic meters, and wherein said instructions configure said first and second cryptographic servers to be communicably connectable to each other to enable said first cryptographic server to determine from said second cryptographic server, whether or not said first message should be encrypted before it is signed.

16. The non-transitory computer readable medium according to claim 13, wherein said instructions configure said first cryptographic server to operate a daemon for handling service requests pertaining to said first message received from said intermediary server and said second protected message being sent to said intermediary server.

17. The non-transitory computer readable medium according to claim 10, wherein said first message is signed, and wherein said second protected message is encrypted and is thereby decrypted.

18. The non-transitory computer readable medium according to claim 17, wherein said first message is encrypted prior to being signed.

19. A cryptographic backend system for enabling an intermediary server to securely communicate with electronic meters, said electronic meters being communicatively connectable to said intermediary server, said intermediary server being controlled by a utility, said utility providing a service associated with said electronic meters, said cryptographic backend system comprising:
one or more cryptographic servers configured for:
provisioning an electronic meter with at least one cryptographic key to enable said electronic meter to cryptographically process messages sent thereto by said utility, said messages being cryptographically processed by said cryptographic backend system on behalf of said utility;
receiving a first request from said intermediary server to cryptographically process a first message to be sent to an electronic meter;
cryptographically processing said first message to generate a first protected message according to requirements associated with said first message and using one or more cryptographic keys corresponding to said at least one cryptographic key associated with provisioned for said electronic meter;
returning said first protected message to said intermediary server for providing said protected message to said electronic meter;
receiving a second protected message from said intermediary server, said second protected message having been generated by said electronic meter cryptographically processing a second message using said at least one cryptographic key, and having been sent by said electronic meter to said intermediary server;
determining one or more cryptographic keys corresponding to said at least one cryptographic key provisioned for said electronic meter;
cryptographically processing said second protected message to obtain said second message; and
returning said second message to said intermediary server to enable said intermediary server to interpret said second message from said electronic meter.

20. The system according to claim 19, wherein said first message has been encoded in a first request sent by said intermediary server, said one or more cryptographic servers being further configured for: decoding said request to obtain said first message upon receipt thereof; and encoding said first protected message in a first response prior to returning said first protected message to said intermediary server.

21. The system according to claim 19, wherein said second protected message has been encoded in a second request sent by said intermediary server, said one or more cryptographic servers being further configured for: decoding said second request to obtain said second protected message upon receipt thereof; and encoding said second message in a second response prior to returning said second message to said intermediary server.

22. The system according to claim 19, wherein said cryptographic backend system comprises a first cryptographic server for processing messages to be sent to said electronic meters, and a second cryptographic server for processing messages received by said intermediary server from said electronic meters.

23. The system according to claim 22, wherein said first cryptographic server is configured to perform encryption and signing operations, and wherein said second cryptographic server is configured to perform decryption operations.

24. The system according to claim 22, wherein said second cryptographic server is configured to store and manage keys associated with said electronic meters, and wherein said first and second cryptographic servers are communicably connectable to each other to enable said first cryptographic server to determine from said second cryptographic server, whether or not said first message should be encrypted before it is signed.

25. The system according to claim 22, wherein said first cryptographic server comprises a daemon for handling service requests pertaining to said first message received from said intermediary server and said second protected message being sent to said intermediary server.

26. The system according to claim 19, wherein said first message is signed, and wherein said second protected message is encrypted and is thereby decrypted by said cryptographic backend system.

27. The system according to claim 26, wherein said first message is encrypted prior to being signed.

28. A method for securely communicating with electronic meters, said electronic meters being communicatively connectable to an intermediary server controlled by a utility, said utility providing a service associated with said electronic meters, said method comprising:
- a cryptographic backend system comprising one or more cryptographic servers provisioning an electronic meter with at least one cryptographic key to enable said electronic meter to cryptographically process messages sent thereto by said utility, said messages being cryptographically processed by said cryptographic backend system on behalf of said utility;
- said intermediary server sending a first request to said cryptographic backend system to cryptographically process a first message to be sent to an electronic meter;
- said cryptographic backend system receiving said first request from said intermediary server;
- said cryptographic backend system cryptographically processing said first message to generate a first protected message according to requirements associated with said first message and using one or more cryptographic keys corresponding to said at least one cryptographic key provisioned for said electronic meter;
- said cryptographic backend system returning said first protected message to said intermediary server;
- said intermediary server receiving said first protected message from said cryptographic backend system and providing said protected message to said electronic meter;
- said intermediary server receiving a second protected message from said electronic meter, said second protected message having been generated by said electronic meter cryptographically processing a second message using said at least one cryptographic key;
- said intermediary server sending said second protected message to said cryptographic backend system;
- said cryptographic backend system receiving said second protected message from said intermediary server;
- said cryptographic backend system determining one or more cryptographic keys corresponding to said at least one cryptographic key provisioned for said electronic meter;
- said cryptographic backend system cryptographically processing said second protected message to obtain said second message;
- said cryptographic backend system returning said second message to said intermediary server;
- said intermediary server receiving said second message from said cryptographic backend system; and
- said intermediary server interpreting said second message from said electronic meter.

* * * * *